(12) United States Patent
Kurata

(10) Patent No.: US 7,857,092 B2
(45) Date of Patent: Dec. 28, 2010

(54) INTERNAL GEAR PUMP AND POWER STEERING DEVICE

(75) Inventor: Masakazu Kurata, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 612 days.

(21) Appl. No.: 11/779,409

(22) Filed: Jul. 18, 2007

(65) Prior Publication Data

US 2008/0017437 A1 Jan. 24, 2008

(30) Foreign Application Priority Data

Jul. 19, 2006 (JP) .............................. 2006-196298

(51) Int. Cl.
*B62D 5/06* (2006.01)
*F04C 2/00* (2006.01)

(52) U.S. Cl. ..................... 180/417; 418/171

(58) Field of Classification Search ............... 180/417; 418/150, 166, 171, 206.5, 132, 133, 32
See application file for complete search history.

(56) References Cited

U.S. PATENT DOCUMENTS

| | | | | |
|---|---|---|---|---|
| 2,547,392 A | * | 4/1951 | Hill et al. ...................... | 418/73 |
| 3,034,448 A | * | 5/1962 | Brundage ..................... | 418/74 |
| 3,198,127 A | * | 8/1965 | Brundage ..................... | 418/73 |
| 3,907,470 A | * | 9/1975 | Harle et al. .................. | 418/170 |
| 6,270,169 B1 | * | 8/2001 | Harada et al. ............ | 303/116.4 |
| 6,425,748 B1 | * | 7/2002 | Miller .......................... | 418/180 |
| 6,474,752 B2 | | 11/2002 | Harada et al. | |
| 6,544,019 B2 | * | 4/2003 | Martin et al. .................. | 418/69 |
| 7,427,191 B2 | * | 9/2008 | Kurata et al. .................. | 418/32 |
| 2002/0170769 A1 | * | 11/2002 | Sakaki et al. ............... | 180/441 |
| 2005/0023073 A1 | * | 2/2005 | Sasaki et al. ................ | 180/422 |
| 2006/0254850 A1 | * | 11/2006 | Sakaki et al. ............... | 180/421 |

FOREIGN PATENT DOCUMENTS

| | | | |
|---|---|---|---|
| DE | 102005048018 A1 | * | 4/2006 |
| JP | 11-117876 A | | 4/1999 |

* cited by examiner

*Primary Examiner*—Anne Marie M Boehler
*Assistant Examiner*—Daniel Yeagley
(74) *Attorney, Agent, or Firm*—Foley & Lardner LLP

(57) ABSTRACT

An internal gear pump has a first port opening into pumping chambers and provided at one side with respect to a first axis interconnecting a confinement portion of the pumping chambers having a maximum volumetric capacity and a deeply-meshed-engagement portion of the pumping chambers having a minimum volumetric capacity, a second port opening into the pumping chambers and provided at the opposite side with respect to the first axis, a first pressure introduction passage intercommunicating the first port and a first-port side area of a clearance space defined on an outer periphery of an outer rotor, and a second pressure introduction passage intercommunicating the second port and a second-port side area of the clearance space. The clearance space of a direction of a second axis perpendicular to the first axis is dimensioned to be greater than the clearance space of a direction of the first axis.

3 Claims, 9 Drawing Sheets

INTERNAL GEAR PUMP AND POWER STEERING DEVICE

TECHNICAL FIELD

The present invention relates to an internal gear pump suitable to a hydraulic power steering device.

BACKGROUND ART

As one type gear pump, there is an internal gear rotary pump, such as a trochoid pump. One such internal gear pump has been disclosed in Japanese Patent Provisional Publication No. 11-117876 (hereinafter is referred to as "JP11-117876"). In the internal gear pump as disclosed in JP11-117876, a discharge pressure is introduced and applied to an outer peripheral portion (of a discharge port side) of an outer rotor via a high-pressure side communication line communicating a discharge port, whereas a suction pressure (an inlet pressure) is introduced and applied to an outer peripheral portion (of a suction port side) of the outer rotor via a low-pressure side communication line communicating a suction port. Owing to the pressure difference, the outer rotor is pushed to an inner rotor, thus reducing a clearance between the outer-rotor inner-toothed portion and the inner-rotor outer-toothed portion, in meshed-engagement with each other.

The inner rotor and the outer rotor are operably accommodated in a casing (a cam ring). During operation of the internal gear pump, that is, when the inner rotor is driven by a drive shaft, the outer rotor also rotates in the same rotational direction as the inner rotor by mesh between the outer-rotor inner-toothed portion and the inner-rotor outer-toothed portion.

SUMMARY OF THE INVENTION

In the internal gear pump as disclosed in JP11-117876, suppose that the axis of the inner rotor slightly deviates from the axis of the drive shaft due to an error of installation of the inner rotor on the drive shaft or due to individual differences of inner rotors manufactured. Due to the slight deviation of the axis (i.e., the geometric center) of the inner rotor from the axis (i.e., the center of rotation) of the drive shaft, the geometric center of the outer rotor also deviates from the axis of the drive shaft. When the outer rotor rotates with the previously-discussed slight deviation (or slight eccentricity) between the axes, a clearance space defined between the inner peripheral surface of the cam ring and the outer peripheral surface of the outer rotor also changes. That is, an outer peripheral portion of the inner rotor in the eccentric direction (or deviated direction) corresponds to the remotest position from the axis of the drive shaft, as compared to the other outer peripheral portion of the inner rotor. Thus, a clearance space defined between the cam ring and the outer rotor in the eccentric direction becomes minimum.

However, the internal gear pump as disclosed in JP11-117876 has the difficulty in further delivering the discharge pressure, which pressure is delivered into the clearance space between the cam ring and the outer rotor, into a downstream side of the previously-noted minimum clearance space. This results in an undesirable change in pressure distribution for working-fluid pressure acting on the outer periphery of the outer rotor owing to a displacement of the minimum clearance space displacing in the rotational direction of the outer rotor. Due to such an undesirable change in pressure distribution of the outer periphery of the outer rotor, in other words, due to such an undesirable change in pressure distribution at the clearance space defined between the cam ring and the outer rotor, the operation and rotary motion of the outer rotor become unstable, and thus the discharge pressure level also becomes unstable.

It is, therefore, in view of the previously-described disadvantages of the prior art, an object of the invention to provide an internal gear pump capable of insuring a stable pressure distribution at a clearance space defined between a cam ring and an outer rotor, thus producing a stable discharge pressure.

In order to accomplish the aforementioned and other objects of the present invention, an internal gear pump comprises a housing having an outer-rotor housing portion, an outer rotor rotatably housed in the outer-rotor housing portion and having an internal toothed gear formed on an inner periphery, an inner rotor rotatably provided in the inner periphery of the outer rotor and having an external toothed gear formed on an outer periphery and in meshed-engagement with the internal toothed gear, a drive shaft fixedly connected to the inner rotor for driving the inner rotor in a selected one of a normal-rotational direction and a reverse-rotational direction, a first port opening into a plurality of pumping chambers defined between the internal and external toothed gears and provided at one side with respect to a first axis interconnecting a confinement portion of the pumping chambers having a maximum volumetric capacity and a deeply-meshed-engagement portion of the pumping chambers having a minimum volumetric capacity, a second port opening into the pumping chambers and provided at the opposite side with respect to the first axis, a first pressure introduction passage intercommunicating the first port and a first-port side area of a clearance space defined on an outer periphery of the outer rotor, and a second pressure introduction passage intercommunicating the second port and a second port-side area of the clearance space defined on the outer periphery of the outer rotor, wherein regarding the clearance space defined between an outer peripheral surface of the outer rotor and an inner peripheral surface of the outer-rotor housing portion, the clearance space of a direction of a second axis perpendicular to the first axis is dimensioned to be greater than the clearance space of a direction of the first axis.

According to another aspect of the invention, an internal gear pump comprises a housing having an outer-rotor housing portion, an outer rotor rotatably housed in the outer-rotor housing portion and having an internal toothed gear formed on an inner periphery, an inner rotor rotatably provided in the inner periphery of the outer rotor and having an external toothed gear formed on an outer periphery and in meshed-engagement with the internal toothed gear, a drive shaft fixedly connected to the inner rotor for driving the inner rotor in a selected one of a normal-rotational direction and a reverse-rotational direction, a first port opening into a plurality of pumping chambers defined between the internal and external toothed gears and provided at one side with respect to a first axis interconnecting a confinement portion of the pumping chambers having a maximum volumetric capacity and a deeply-meshed-engagement portion of the pumping chambers having a minimum volumetric capacity, a second port opening into the pumping chambers and provided at the opposite side with respect to the first axis, a first pressure introduction passage intercommunicating the first port and a first-port side area of a clearance space defined on an outer periphery of the outer rotor, and a second pressure introduction passage intercommunicating the second port and a second port-side area of the clearance space defined on the outer periphery of the outer rotor, wherein an inner peripheral surface of the outer-rotor housing portion is formed into a substantially elliptic shape that the first axis is a minor axis and a second axis through the center of the minor axis and perpendicular to the first axis is a major axis whose length is longer than the minor axis.

According to a further aspect of the invention, an internal gear pump comprises a housing having an outer-rotor housing portion, an outer rotor rotatably housed in the outer-rotor housing portion and having an internal toothed gear formed on an inner periphery, an inner rotor rotatably provided in the inner periphery of the outer rotor and having an external toothed gear formed on an outer periphery and in meshed-engagement with the internal toothed gear, a drive shaft fixedly connected to the inner rotor for driving the inner rotor in a selected one of a normal-rotational direction and a reverse-rotational direction, a first port opening into a plurality of pumping chambers defined between the internal and external toothed gears and provided at one side with respect to a first axis interconnecting a confinement portion of the pumping chambers having a maximum volumetric capacity and a deeply-meshed-engagement portion of the pumping chambers having a minimum volumetric capacity, a second port opening into the pumping chambers and provided at the opposite side with respect to the first axis, a first pressure introduction passage intercommunicating the first port and a first-port side area of a clearance space defined on an outer periphery of the outer rotor, and a second pressure introduction passage intercommunicating the second port and a second port-side area of the clearance space defined on the outer periphery of the outer rotor, wherein regarding a pressure distribution of hydraulic pressure introduced into the clearance space defined between an outer peripheral surface of the outer rotor and an inner peripheral surface of the outer-rotor housing portion during operation of the pump, the hydraulic pressure in the clearance space of a direction along a second axis perpendicular to the first axis is higher than the hydraulic pressure in the clearance space of a direction along the first axis.

According to a still further aspect of the invention, an internal gear pump comprises a housing having an outer-rotor housing portion, an outer rotor rotatably housed in the outer-rotor housing portion and having an internal toothed gear formed on an inner periphery, an inner rotor rotatably provided in the inner periphery of the outer rotor and having an external toothed gear formed on an outer periphery and in meshed-engagement with the internal toothed gear, a drive shaft fixedly connected to the inner rotor for driving the inner rotor in a selected one of a normal-rotational direction and a reverse-rotational direction, a first port opening into a plurality of pumping chambers defined between the internal and external toothed gears and provided at one side with respect to a first axis interconnecting a confinement portion of the pumping chambers having a maximum volumetric capacity and a deeply-meshed-engagement portion of the pumping chambers having a minimum volumetric capacity, a second port opening into the pumping chambers and provided at the opposite side with respect to the first axis, a first pressure introduction passage intercommunicating the first port and a first-port side area of a clearance space defined on an outer periphery of the outer rotor, and a second pressure introduction passage intercommunicating the second port and a second port-side area of the clearance space defined on the outer periphery of the outer rotor, wherein a composite vector of pressures, acting on the outer periphery of the outer rotor within the first-port side area of the clearance space, is produced between a second axis perpendicular to the first axis and the first pressure introduction passage, while a composite vector of pressures, acting on the outer periphery of the outer rotor within the second-port side area of the clearance space, is produced between the second axis and the second pressure introduction passage.

According to another aspect of the invention, a hydraulic power steering device comprises a hydraulic power cylinder having first and second hydraulic chambers for assisting a steering force of a steering mechanism adapted to be linked to steered road wheels, a first fluid line connected to the first hydraulic chamber, a second fluid line connected to the second hydraulic chamber, a reversible pump comprising a drive shaft, a plurality of pumping chambers configured to pressurize working fluid by way of normal-rotation and reverse-rotation of the drive shaft, a first suction-and-discharge port interconnecting the pumping chambers and the first fluid line, and a second suction-and-discharge port interconnecting the pumping chambers and the second fluid line, for selectively supplying the working fluid from the pumping chambers into either one of the first and second fluid lines, and an electric motor connected to the drive shaft for rotating the reversible pump in a selected one of a normal-rotational direction and a reverse-rotational direction, the reversible pump comprising a housing having an outer-rotor housing portion, an outer rotor rotatably housed in the outer-rotor housing portion and having an internal toothed gear formed on an inner periphery, an inner rotor rotatably provided in the inner periphery of the outer rotor and having an external toothed gear formed on an outer periphery and in meshed-engagement with the internal toothed gear, the drive shaft fixedly connected to the inner rotor for driving the inner rotor in the selected one of the normal-rotational direction and the reverse-rotational direction, the first suction-and-discharge port opening into the pumping chambers defined between the internal and external toothed gears and provided at one side with respect to a first axis interconnecting a confinement portion of the pumping chambers having a maximum volumetric capacity and a deeply-meshed-engagement portion of the pumping chambers having a minimum volumetric capacity, the second suction-and-discharge port opening into the pumping chambers and provided at the opposite side with respect to the first axis, a first pressure introduction passage intercommunicating the first suction-and-discharge port and a first-port side area of a clearance space defined on an outer periphery of the outer rotor, and a second pressure introduction passage intercommunicating the second suction-and-discharge port and a second-port side area of the clearance space defined on the outer periphery of the outer rotor, wherein an inner peripheral surface of the outer-rotor housing portion is formed into a substantially elliptic shape that the first axis is a minor axis and a second axis through the center of the minor axis and perpendicular to the first axis is a major axis whose length is longer than the minor axis.

The other objects and features of this invention will become understood from the following description with reference to the accompanying drawings.

DESCRIPTION OF THE PREFERRED EMBODIMENTS

Figure 1:
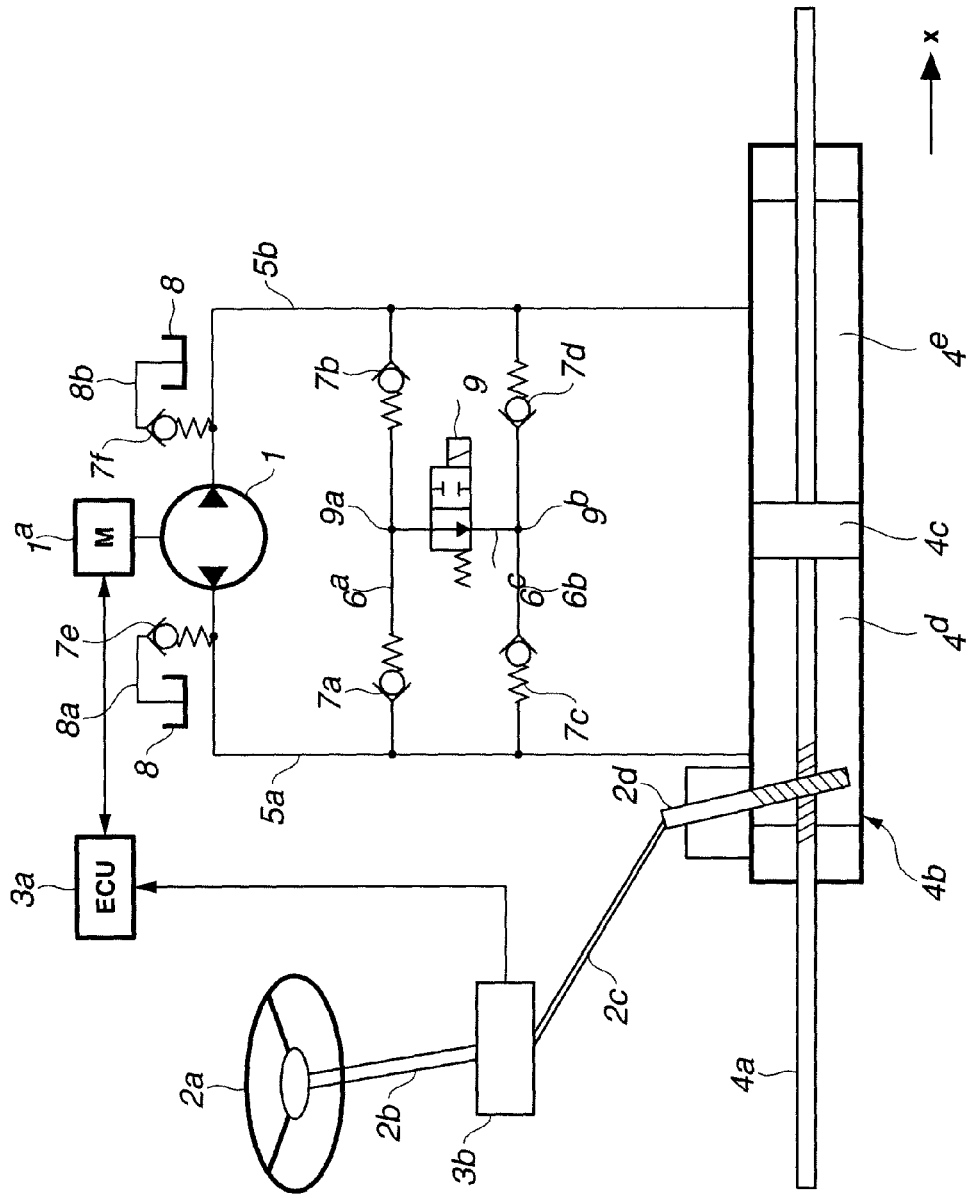
FIG. 1 is a system diagram of a hydraulic power steering device to which an internal gear pump of an embodiment can be applied.

Referring now to the drawings, particularly to FIG. 1, an internal gear rotary pump of the embodiment is exemplified in an automobile hydraulic power steering device.

[System Configuration of Hydraulic Power Steering Device Using Internal Gear Pump]

FIG. 1 shows the system configuration of the hydraulic power steering device using the internal gear rotary pump of the embodiment. When a steering wheel $2a$ is turned by the driver, a pinion shaft $2d$ is driven through a steering shaft $2b$ and a column shaft $2c$. A rack shaft $4a$ moves in its axial direction corresponding to the rotational direction of pinion shaft $2d$ via a rack-and-pinion mechanism, which is constructed by a rack on rack shaft $4a$ and a pinion on the lower end of pinion shaft $2d$. Then, the movement of rack shaft $4a$ is transferred via steering linkages such as left and right tie rods and left and right steering knuckles, to respective steered road wheels (i.e., front road wheels) for steering. A torque sensor $3b$ is attached to steering shaft $2b$ for detecting a steering torque applied via steering wheel $2a$ to steering shaft $2b$ by the driver, and for generating a torque sensor signal, indicative of the direction as well as the magnitude of the detected steering torque, to an electronic control unit (ECU) $3a$.

A hydraulically-operated power steering mechanism is attached to rack shaft $4a$ for assisting the movement of rack shaft $4a$ depending on the driver-applied steering torque input. The power steering mechanism is comprised of a reversible internal gear pump 1 (the eccentric-rotor type internal gear rotary pump of the embodiment), and a hydraulic power cylinder $4b$. Reversible internal gear pump 1 is driven by an electric motor $1a$. Hydraulic power cylinder $4b$ generates a steering assist force for leftward or rightward movement of rack shaft $4a$. A piston $4c$ is axially movably provided in hydraulic power cylinder $4b$. The internal space of cylinder $4b$ is divided into two chambers by piston $4c$, namely, a first cylinder chamber $4d$ and a second cylinder chamber $4e$.

$1^{st}$ cylinder chamber $4d$ and internal gear pump 1 are connected to each other via a first fluid line $5a$, whereas $2^{nd}$ cylinder chamber $4e$ and internal gear pump 1 are connected to each other via a second fluid line $5b$. $1^{st}$ fluid line $5a$ is connected to a reservoir tank 8 via a first suction line (or a first branch line) $8a$. $2^{nd}$ fluid line $5b$ is connected to reservoir tank 8 via a second suction line (or a second branch line) $8b$. A first suction-side one-way check valve $7e$ is disposed in $1^{st}$ suction line $8a$ to permit only the free flow of working fluid from reservoir tank 8 into $1^{st}$ fluid line $5a$. $1^{st}$ suction-side one-way check valve $7e$ prevents backflow of working fluid from $1^{st}$ fluid line $5a$ via $1^{st}$ suction line $8a$ to reservoir tank 8. A second suction-side one-way check valve $7f$ is disposed in $2^{nd}$ suction line $8b$ to permit only the free flow of working fluid from reservoir tank 8 into $2^{nd}$ fluid line $5b$. $2^{nd}$ suction-side one-way check valve $7f$ prevents backflow of working fluid from $2^{nd}$ fluid line $5b$ via $2^{nd}$ suction line $8b$ to reservoir tank 8.

$1^{st}$ and $2^{nd}$ fluid lines $5a$-$5b$ are connected to each other by means of two parallel communication lines, namely, first and second communication lines $6a$-$6b$ not through internal gear pump 1. A substantially midpoint (hereinafter is referred to as a "$1^{st}$ joined portion $9a$") of $1^{st}$ communication line $6a$ and a substantially midpoint (hereinafter is referred to as a "$2^{nd}$ joined portion $9b$") of $2^{nd}$ communication line $6b$ are connected to each other via a third communication line $6c$. A fail-safe valve 9 is disposed in $3^{rd}$ communication line $6c$, for establishing or blocking fluid communication between $1^{st}$ and $2^{nd}$ communication lines $6a$-$6b$ by the fail-safe valve. Fail-safe valve 9 is a normally-open, single solenoid-actuated, 2-port, 2-position, spring-offset directional control valve.

A first check valve $7a$ is disposed in $1^{st}$ communication line $6a$ and arranged between $1^{st}$ joined portion $9a$ and $1^{st}$ fluid line $5a$. A second check valve $7b$ is disposed in $1^{st}$ communication line $6a$ and arranged between $1^{st}$ joined portion $9a$ and $2^{nd}$ fluid line $5b$. $1^{st}$ check valve $7a$ is disposed in $1^{st}$ communication line $6a$ to permit only the free flow of working fluid from $1^{st}$ fluid line $5a$ to $1^{st}$ joined portion $9a$. $2^{nd}$ check valve $7b$ is disposed in $1^{st}$ communication line $6a$ to permit only the free flow of working fluid from $2^{nd}$ fluid line $5b$ to $1^{st}$ joined portion $9a$.

A third check valve $7c$ is disposed in $2^{nd}$ communication line $6b$ and arranged between $2^{nd}$ joined portion $9b$ and $1^{st}$ fluid line $5a$. A fourth check valve $7d$ is disposed in $2^{nd}$ communication line $6b$ and arranged between $2^{nd}$ joined portion $9b$ and $2^{nd}$ fluid line $5b$. $3^{rd}$ check valve $7c$ is disposed in $2^{nd}$ communication line $6b$ to permit only the free flow of working fluid from $2^{nd}$ joined portion $9b$ to $1^{st}$ fluid line $5a$. $4^{th}$ check valve $7d$ is disposed in $2^{nd}$ communication line $6b$ to permit only the free flow of working fluid from $2^{nd}$ joined portion $9b$ to $2^{nd}$ fluid line $5b$.

In FIG. 1, control unit $3a$ generally comprises a microcomputer. Control unit $3a$ includes an input/output interface (I/O), memories (RAM, ROM), and a microprocessor or a central processing unit (CPU). The input/output interface (I/O) of control unit $3a$ receives input information from various engine/vehicle switches and sensors, that is, torque sensor $3b$, an ignition switch, a crank angle sensor (a crankshaft position sensor), a vehicle speed sensor, and the like. The crank angle sensor generates a sensor signal indicative of engine speed, whereas the vehicle speed sensor generates a sensor signal indicative of vehicle speed. Within control unit $3a$, the central processing unit (CPU) allows the access by the I/O interface of input informational data signals from the previously-discussed engine/vehicle switches and sensors. The CPU of control unit 3a is responsible for carrying the power steering control program stored in memories and is capable of performing necessary arithmetic and logic operations. Computational results (arithmetic calculation results), that is, calculated output signals, concretely, a steering assist force, are relayed through the output interface circuitry of the control unit to output stages, namely an electromagnetic solenoid of fail-safe valve 9 and motor 1a having a driving connection with internal gear pump 1.

[Construction of Internal Gear Pump]

(Longitudinal Cross-Sectional View of Internal Gear Pump, Sectioned in Axial Direction)

Figure 2:
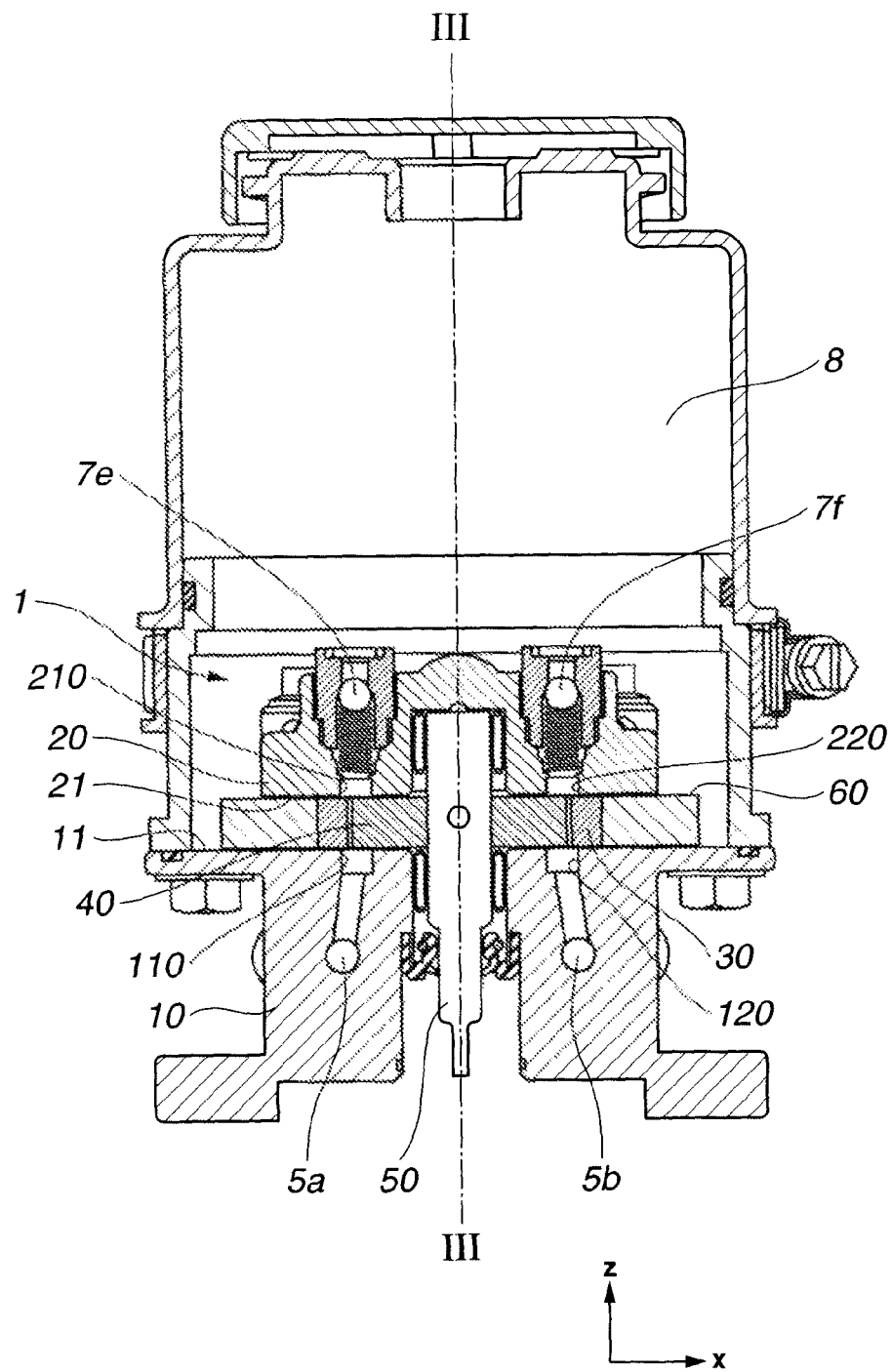
FIG. 2 is a longitudinal cross-sectional view illustrating the internal gear pump of the embodiment.

As seen from the cross section of FIG. 2, internal gear pump 1 operates as a reversible pump. Internal gear pump 1 is comprised of a first housing 10, a second housing 20, an outer rotor 30, an inner rotor 40, a drive shaft 50, and a cam ring 60. In explaining the embodiment, the axial direction of internal gear pump 1 is defined as a z-axis, and a direction oriented from a suction port (an inlet port) 210 (exactly, a second suction port formed in $2^{nd}$ housing 20) to a discharge port (a pressure port) 220 (exactly, a second discharge port formed in $2^{nd}$ housing 20) and existing in a plane perpendicular to the z-axis is defined as an x-axis.

Cam ring 60 is formed as a substantially annular member, and housed in $1^{st}$ and $2^{nd}$ housings 10-20, exactly, in a positive-z-axis-direction face 11 of $1^{st}$ housing 10 and a negative-z-axis-direction face 21 of $2^{nd}$ housing 20. Outer rotor 30 and inner rotor 40 are operably accommodated in a substantially cylindrical bore of cam ring 60. More concretely, an inner periphery 61 (serving as an outer-rotor housing portion) of cam ring 60, accommodating therein outer rotor 30, is not configured as a complete round, but as a substantially elliptic shape (see FIG. 3).

As clearly seen in the left-half of the cross section of FIG. 2, a first suction port 110 is provided or formed in a positive-z-axis-direction face 11 of $1^{st}$ housing 10 and laid out within an area of the negative x-axis direction with respect to the straight line III-III. On the other hand, a first discharge port 120 is provided or formed in positive-z-axis-direction face 11 of $1^{st}$ housing 10 and laid out within an area of the positive x-axis direction with respect to the straight line III-III.

(Radial-Direction Elevation View)

Figure 3:
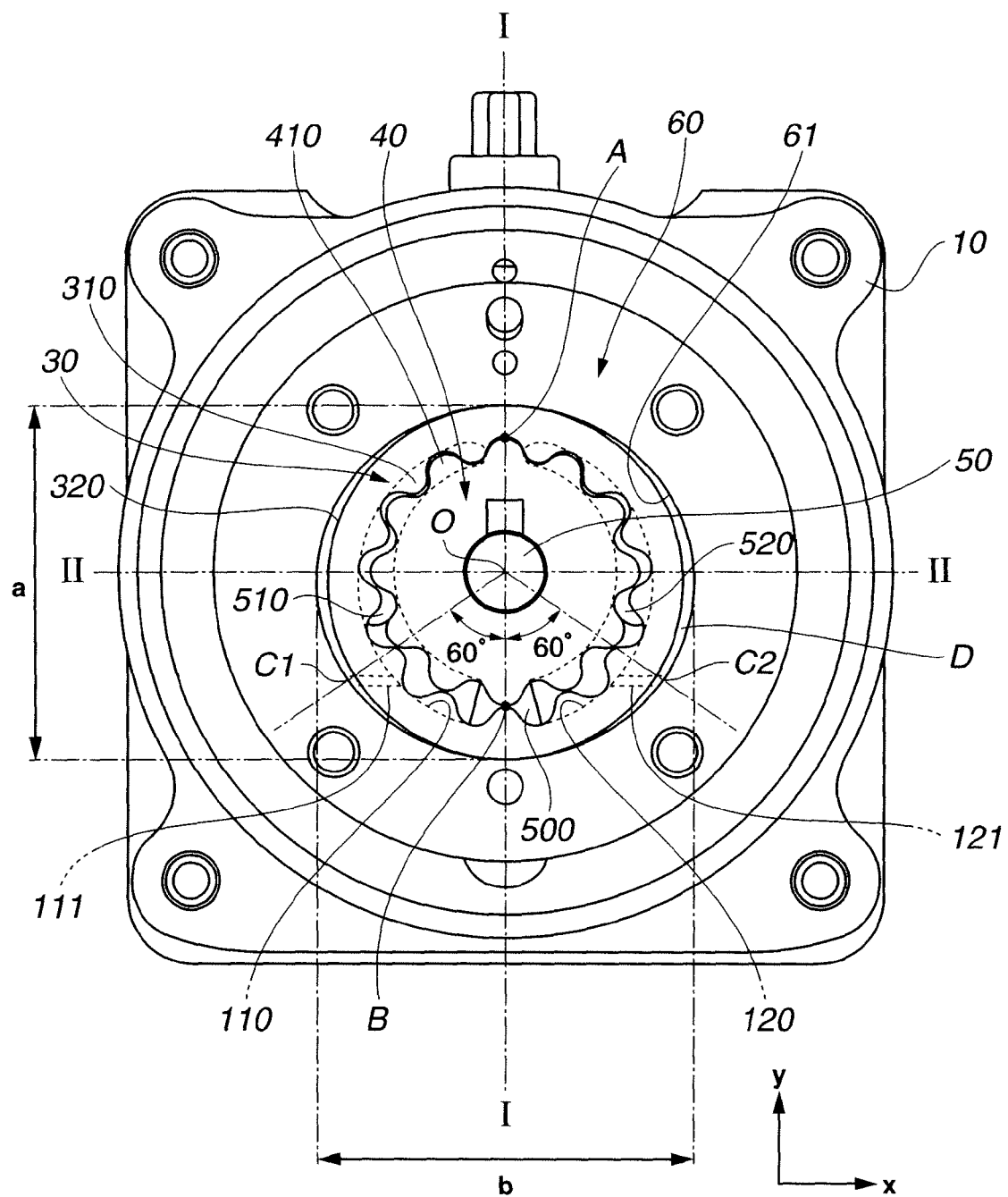
FIG. 3 is a radial-direction elevation view illustrating the internal gear pump of the embodiment in a state where a second housing is removed, as viewed in the axial direction of a drive shaft.
Figure 4:
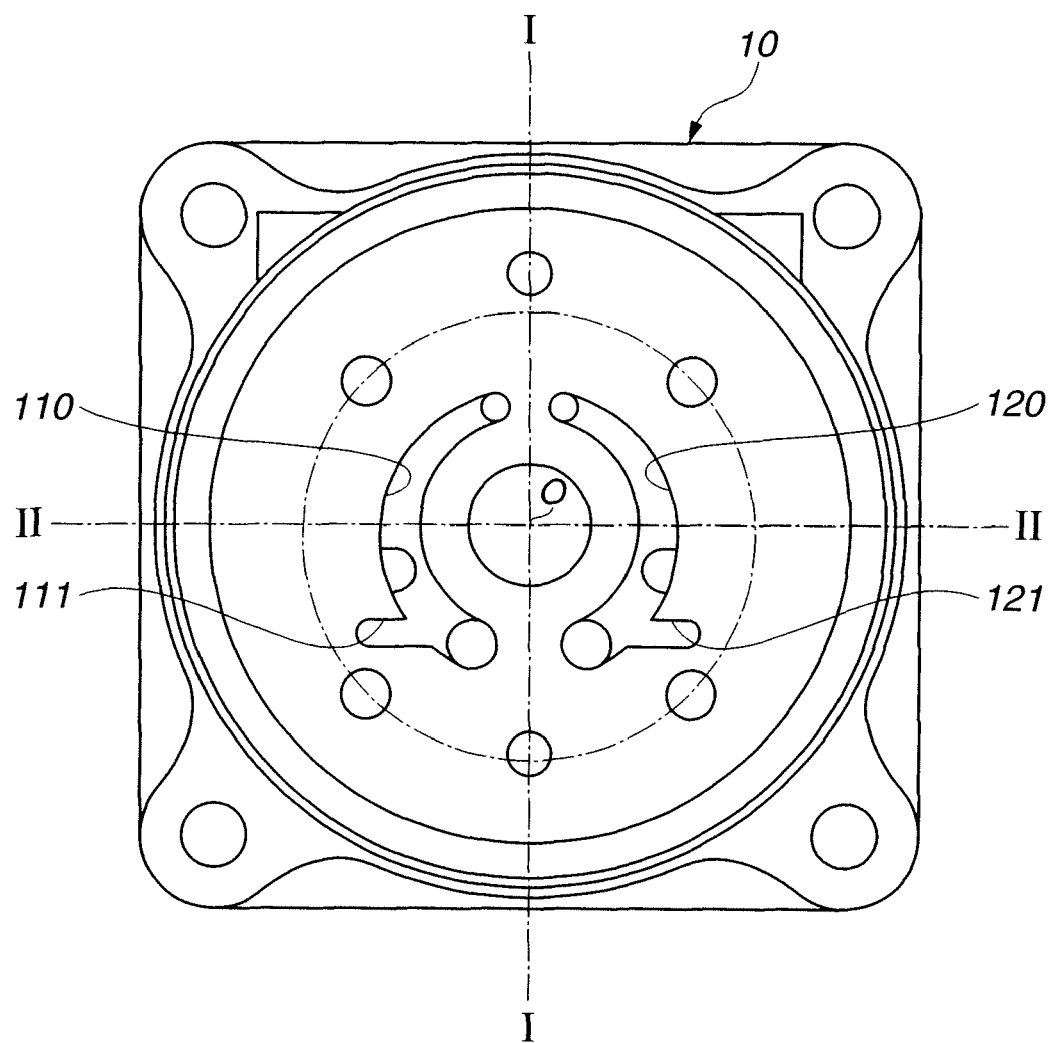
FIG. 4 is a radial-direction elevation view illustrating a first housing, as viewed in the axial direction of a first-housing central bore into which the drive shaft is fitted.
Figure 4:
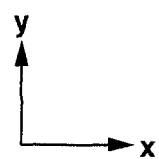

FIG. 3 shows the radial-direction elevation of internal gear pump 1 with $2^{nd}$ housing 20 removed, whereas FIG. 4 shows the radial-direction elevation of $1^{st}$ housing 10. In FIGS. 3-4, an axis perpendicular to both the x-axis and the z-axis (see FIG. 2) is defined as a y-axis. Regarding the y-axis, a direction of a completely-meshed-engagement (deeply-meshed-engagement) portion of outer rotor 30 and inner rotor 40 is defined as the positive y-axis direction.

As previously described, cam ring 60 accommodates outer rotor 30 in the substantially cylindrical bore, and inner rotor 40 is accommodated in the internal space of outer rotor 30. Inner periphery 61 of cam ring 60 is formed as a bore hole having a substantially elliptic shape. The line II-II (the second axis) through the center O of drive shaft 50 and parallel to the x-axis corresponds to the major axis of the substantially elliptic shape of cam-ring inner periphery 61. The line I-I (the first axis) through the drive-shaft center O and parallel to the y-axis and thus perpendicular to the major axis (i.e., the $2^{nd}$ axis II-II) corresponds to the minor axis of the substantially elliptic shape of cam-ring inner periphery 61. The length of the major axis (the $2^{nd}$ axis II-II) is taken to be "b", whereas the length of the minor axis (the $1^{st}$ axis I-I) is taken to be "a".

The length "b" of the major axis (the $2^{nd}$ axis II-II) is greater than the length "a" of the minor axis (the $1^{st}$ axis I-I), that is, b>a.

Outer rotor 30 is formed on its inner periphery with an internal toothed gear 310. The outer peripheral surface 320 of outer rotor 30 is in cammed-connection with the wall surface of cam-ring inner periphery 61, such that outer rotor 30 is rotatably housed in cam ring 60. Inner rotor 40 is formed on its outer periphery with an external toothed gear 410. The internal toothed gear 310 of outer rotor 30 is in meshed-engagement with the external toothed gear 410 of inner rotor 40.

The tooth pitch (or a circular pitch) of internal toothed gear 310 and the tooth pitch (or a circular pitch) of external toothed gear 410 are the same. In the shown embodiment, the number Zin of teeth of internal toothed gear 310 of outer rotor 30 is designed or set to the summed value (Zex+1) of the number Zex of teeth of external toothed gear 410 of inner rotor 40 and "1". In lieu thereof, the number Zin of teeth of internal toothed gear 310 of outer rotor 30 may be set to the summed value (Zex+2, Zex+3, or . . . ) of the number Zex of teeth of external toothed gear 410 of inner rotor 40 plus "2" or more.

In the shown embodiment, the number Zin of teeth of internal toothed gear 310 of outer rotor 30 is designed to be greater than the number Zex of teeth of external toothed gear 410 of inner rotor 40 by "1". Thus, internal toothed gear 310 and external toothed gear 410 are meshed with each other, while the axis of inner rotor 40 is eccentric to the axis of outer rotor 30. A plurality of pumping chambers 500 are defined between internal toothed gear 310 and external toothed gear 410.

$1^{st}$ suction port 110 and $1^{st}$ discharge port 120 are formed in $1^{st}$ housing 10, and arranged within an area substantially conforming to pumping chambers 500. As best seen in FIG. 4, each of $1^{st}$ suction port 110 and $1^{st}$ discharge port 120 is formed as a substantially crescent-shaped recessed portion, such that the substantially crescent-shaped recessed portion of $1^{st}$ suction port 110 and the substantially crescent-shaped recessed portion of $1^{st}$ discharge port 120 are symmetrical with each other with respect to the $1^{st}$ axis I-I (the minor axis) of FIG. 4, in other words, with respect to the line III-III of FIG. 2. The crescent-shaped $1^{st}$ suction port 110 communicates $1^{st}$ fluid line 5a, while the crescent-shaped recessed portion of $1^{st}$ discharge port 120 communicates $2^{nd}$ fluid line 5b (see FIG. 2). In operation, inner rotor 40 is rotated, which causes outer rotor 30 to turn also. During rotation of inner and outer rotors 40 and 30, pumping action is made by way of a change in volumetric capacity in the clearance space (the gaps between the teeth) defined between the external toothed gear 410 of inner rotor 40 and the internal toothed gear 310 of outer rotor 30.

As seen in FIGS. 3-4, $1^{st}$ suction port 110, formed in $1^{st}$ housing 10, is formed with a suction-side pressure introduction passage 111 extending in the negative x-axis direction. $1^{st}$ discharge port 120, formed in $1^{st}$ housing 10, is formed with a discharge-side pressure introduction passage 121 extending in the positive x-axis direction. These pressure introduction passages 111 and 121 are laid out within an area of the negative y-axis direction with respect to the center of the first-housing central bore of $1^{st}$ housing 10, that is, the drive-shaft center O. Suction-side pressure introduction passage (i.e., a low-pressure side communication line) 111 intercommunicates $1^{st}$ suction port 110 and a cam-ring-and-outer-rotor clearance space D defined between cam ring 60 and outer rotor 30, so as to introduce a hydraulic pressure in suction port 110 to clearance space D. On the other hand, discharge-side pressure introduction passage (i.e., a high-pressure side communication line) 121 intercommunicates 1$^{st}$ discharge port 120 and cam-ring-and-outer-rotor clearance space D, so as to introduce a hydraulic pressure in discharge port 120 to clearance space D. For the sake of simplicity, in the drawings, only the pressure introduction passages 111 and 121 of the 1$^{st}$ housing side are clearly shown. Although pressure introduction passages 211 and 221 of the 2$^{nd}$ housing side are not clearly shown in the drawings, actually, 2$^{nd}$ suction port 210, formed in 2$^{nd}$ housing 20, has a suction-side pressure introduction passage 211 extending in the negative x-axis direction. 2$^{nd}$ discharge port 220, formed in 2$^{nd}$ housing 20, has a discharge-side pressure introduction passage 221 extending in the positive x-axis direction. These pressure introduction passages 211 and 221 are laid out within an area of the negative y-axis direction with respect to the center of the second-housing central bore of 2$^{nd}$ housing 20, that is, the drive-shaft center O. Suction-side pressure introduction passage (i.e., a low-pressure side communication line) 211 intercommunicates 2$^{nd}$ suction port 210 and cam-ring-and-outer-rotor clearance space D defined between cam ring 60 and outer rotor 30, so as to introduce a hydraulic pressure in suction port 210 to clearance space D. On the other hand, discharge-side pressure introduction passage (i.e., a high-pressure side communication line) 221 intercommunicates 2$^{nd}$ discharge port 220 and cam-ring-and-outer-rotor clearance space D, so as to introduce a hydraulic pressure in discharge port 220 to clearance space D. The pressure introduction passages denoted by respective reference signs 111, 121, 211, and 221 are hereinafter referred to as "1$^{st}$ suction-side pressure introduction passage", "1$^{st}$ discharge-side pressure introduction passage", "2$^{nd}$ suction-side pressure introduction passage", and "2$^{nd}$ discharge-side pressure introduction passage", in that order.

In the shown embodiment, regarding a definition of a straight line O-C1 interconnecting the negative-x-axis-direction outermost end C1 of suction-side pressure introduction passage 111 and the drive-shaft center O (the center of rotation of inner rotor 40), the straight line O-C1 is configured such that the line O-C1 is displaced 60 degrees in a clockwise direction from the line I-I (the 1$^{st}$ axis). In a similar manner, regarding a definition of a straight line O-C2 interconnecting the positive-x-axis-direction outermost end C2 of discharge-side pressure introduction passage 121 and the drive-shaft center O (the center of rotation of inner rotor 40), the straight line O-C2 is configured such that the line O-C2 is displaced 60 degrees in an anti-clockwise direction from the 1$^{st}$ axis I-I (see FIG. 3).

The negative-x-axis-direction outermost end C1 of 1$^{st}$ suction-side pressure introduction passage 111 is formed to be circumferentially offset toward the 2$^{nd}$ axis II-II (the major axis) from the hypothetical position located on cam-ring inner periphery 61 and extending radially from the joined portion (corresponding to the positive-x-axis-direction innermost end of 1$^{st}$ suction-side pressure introduction passage 111) of 1$^{st}$ suction port 110 and 1$^{st}$ suction-side pressure introduction passage 111. In a similar manner, the negative-x-axis-direction outermost end of 2$^{nd}$ suction-side pressure introduction passage 211 is formed to be circumferentially offset toward the 2$^{nd}$ axis II-II (the major axis) from the hypothetical position located on cam-ring inner periphery 61 and extending radially from the joined portion (corresponding to the positive-x-axis-direction innermost end of 2$^{nd}$ suction-side pressure introduction passage 211) of 2$^{nd}$ suction port 210 and 2$^{nd}$ suction-side pressure introduction passage 211. On the other hand, the positive-x-axis-direction outermost end C2 of 1$^{st}$ discharge-side pressure introduction passage 121 is formed to be circumferentially offset toward the 2$^{nd}$ axis II-II (the major axis) from the hypothetical position located on cam-ring inner periphery 61 and extending radially from the joined portion (corresponding to the negative-x-axis-direction innermost end of 1$^{st}$ discharge-side pressure introduction passage 121) of 1$^{st}$ discharge port 120 and 1$^{st}$ discharge-side pressure introduction passage 121. In a similar manner, the positive-x-axis-direction outermost end of 2$^{nd}$ discharge-side pressure introduction passage 221 is formed to be circumferentially offset toward the 2$^{nd}$ axis II-II (the major axis) from the hypothetical position located on cam-ring inner periphery 61 and extending radially from the joined portion (corresponding to the negative-x-axis-direction innermost end of 2$^{nd}$ discharge-side pressure introduction passage 221) of 2$^{nd}$ discharge port 220 and 2$^{nd}$ discharge-side pressure introduction passage 221.

Owing to the eccentricity between outer rotor 30 and inner rotor 40 in the eccentric-rotor type internal gear pump 1, internal toothed gear 310 and external toothed gear 410 become engaged more densely or more thickly, as the meshed-engagement portion approaches closer to the positive y-axis end A, corresponding to a completely-meshed-engagement portion as described hereunder. As clearly shown in FIG. 3, internal toothed gear 310 and external toothed gear 410 becomes completely meshed with each other at the positive y-axis end A, and thus the volumetric capacity in pumping chamber 500 becomes minimum at the positive y-axis end A (the completely-meshed-engagement portion). Conversely, as the meshed-engagement portion of internal toothed gear 310 and external toothed gear 410 approaches closer to a confinement portion B corresponding to the negative y-axis end opposing to the positive y-axis end A, the meshed-engagement portion shifts to its disengaged state. At the confinement portion B corresponding to the negative y-axis end opposing to the positive y-axis end A, internal toothed gear 310 and external toothed gear 410 becomes completely disengaged from each other, and thus the volumetric capacity in pumping chamber 500 becomes maximum at the confinement portion B.

A clearance between internal toothed gear 310 and external toothed gear 410 is designed to become a substantially zero clearance at the confinement portion B (corresponding to the negative y-axis end), without contact between tips of the two opposing teeth.

More concretely, when inner rotor 40 is rotated anti-clockwise by drive shaft 50 and thus outer rotor 30 also rotates in the same direction, the area of pumping chambers 500 of the negative x-axis direction with respect to the 1$^{st}$ axis I-I (the minor axis) becomes a suction area 510 whose volumetric capacity increases according to the anti-clockwise rotation of two rotors 30 and 40 in meshed-engagement. In FIG. 3, the negative-x-axis-direction area (the left-hand side area) of pumping chambers 500 corresponds to 1$^{st}$ and 2$^{nd}$ suction ports 110 and 210. On the other hand, the area of pumping chambers 500 of the positive x-axis direction with respect to the 1$^{st}$ axis I-I (the minor axis) becomes a discharge area 520 whose volumetric capacity decreases according to the anti-clockwise rotation of the two rotors. In FIG. 3, the positive-x-axis-direction area (the right-hand side area) of pumping chambers 500 corresponds to 1$^{st}$ and 2$^{nd}$ discharge ports 120 and 220. In contrast, when inner rotor 40 is rotated clockwise by drive shaft 50 and thus outer rotor 30 also rotates in the same direction, the negative-x-axis-direction area (the left-hand side area) of pumping chambers 500 functions as a discharge area whose volumetric capacity decreases according to the clockwise rotation of the two rotors, whereas the positive-x-axis-direction area (the right-hand side area) of pumping chambers 500 functions as a suction area whose volumetric capacity increases according to the clockwise rotation of the two rotors. That is, the relationship of the suction side and the discharge side is reversed depending on the direction of rotation of rotors 30 and 40. For the sake of simplicity of the following discussion, the two rotors are considered or assumed to rotate anti-clockwise.

Drive shaft 50, which is arranged parallel to the z-axis, is fixedly connected to the motor shaft of motor 1a (see FIG. 1) to drive inner rotor 40. During rotation of drive shaft 50, outer rotor 30 also rotates in the same rotational direction as inner rotor 40 by mesh between internal toothed gear 310 and external toothed gear 410. Internal gear pump 1 functions as a reversible pump by rotating drive shaft 50 in a selected one of a normal-rotational direction and a reverse-rotational direction.

As previously discussed, $1^{st}$ suction-side pressure introduction passage 111 and $1^{st}$ discharge-side pressure introduction passage 121 are formed to extend in the x-axis direction (i.e., the direction along the major axis II-II). And thus, regarding a pressure distribution of hydraulic pressure introduced into cam-ring-and-outer-rotor clearance space D, the hydraulic pressure in clearance space D of the direction along the major axis II-II tends to become higher than that of the direction along the minor axis I-I. The hydraulic pressure of the suction port side ($1^{st}$ and $2^{nd}$ suction ports 110 and 210) along the major axis II-II becomes substantially identical to the hydraulic pressure in $1^{st}$ and $2^{nd}$ suction-side pressure introduction passages 111 and 211. The hydraulic pressure of the discharge port side ($1^{st}$ and $2^{nd}$ discharge ports 120 and 220) along the major axis II-II becomes substantially identical to the hydraulic pressure in $1^{st}$ and $2^{nd}$ discharge-side pressure introduction passages 121 and 221.

As set out above, since cam-ring inner periphery 61 is substantially elliptic in shape, the clearance space D, defined on the side of the major axis II-II with respect to $1^{st}$ and $2^{nd}$ suction-side pressure introduction passages 111 and 211, becomes greater than the clearance space D, defined on the side of the confinement portion B with respect to $1^{st}$ and $2^{nd}$ suction-side pressure introduction passages 111 and 211.

(Displacement of Outer Rotor within Cam Ring)

As discussed previously, inner periphery 61 of cam ring 60 is shaped into a substantially ellipse in which the $2^{nd}$ axis II-II along the x-axis is formed as a major axis, and the $1^{st}$ axis I-I along the y-axis is formed as a minor axis. The length of the minor axis (the $1^{st}$ axis I-I along the y-axis) is taken to be "a", whereas the length of the major axis (the $2^{nd}$ axis II-II along the x-axis) is taken to be "b" (>a). In the shown embodiment, cam-ring inner periphery 61 is substantially elliptic in shape. The shape of cam-ring inner periphery 61 is not limited to such a substantially elliptic shape, but cam-ring inner periphery 61 may be shaped into an oval shape that a pair of half rounds (a pair of semi-circles) are combined or connected with each other. Alternatively, the shape of cam-ring inner periphery 61 may be formed as a geometrical ellipse, which is obtained by stretching or squashing a circle.

Due to the substantially elliptic shape (or the substantially oval shape or the geometrical elliptic shape) of cam-ring inner periphery 61, regarding the radial clearance space D defined between cam ring 60 and outer rotor 30, the radial clearance space D extending in the x-axis direction (the direction of $2^{nd}$ axis II-II) is dimensioned to be greater than the radial clearance space D extending in the y-axis direction (the direction of $1^{st}$ axis I-I). Thus, outer rotor 30 is housed in cam-ring inner periphery 61 in such a manner as to be displaceable in the x-axis direction.

The clearance space D defined between the outer peripheral surface 320 of outer rotor 30 and the inner peripheral surface (inner periphery 61) of cam ring 60 becomes a maximum value on the $2^{nd}$ axis II-II parallel to the x-axis. The inner peripheral surface of cam ring 60 is formed or shaped to circumferentially continuously change from the side of $1^{st}$ axis I-I parallel to the y-axis to the side of $2^{nd}$ axis II-II parallel to the x-axis.

[The Relationship Between Direction of Action of Force Acting on Outer Rotor and Pump Performance]

Figure 5:
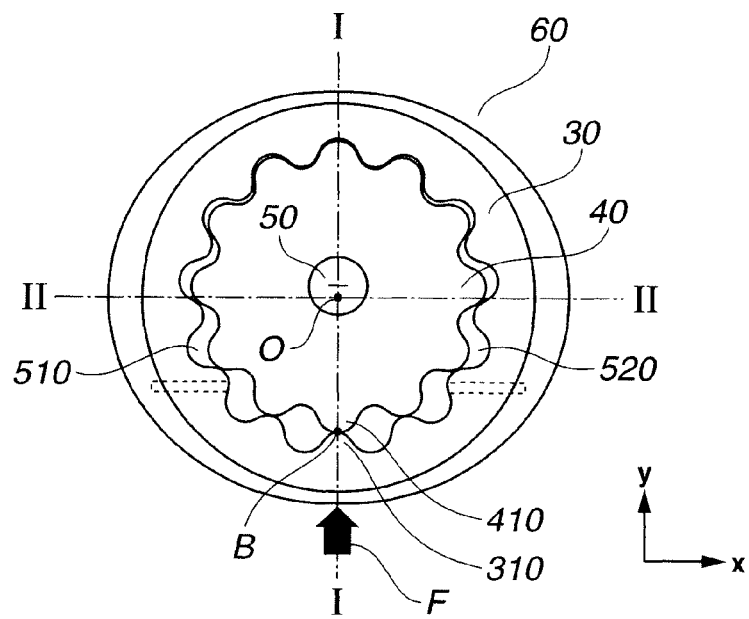
FIG. 5 is an explanatory drawing illustrating the relationship between the direction of action of a force F acting on an outer rotor in the positive y-axis direction and a pump performance.
Figure 6:
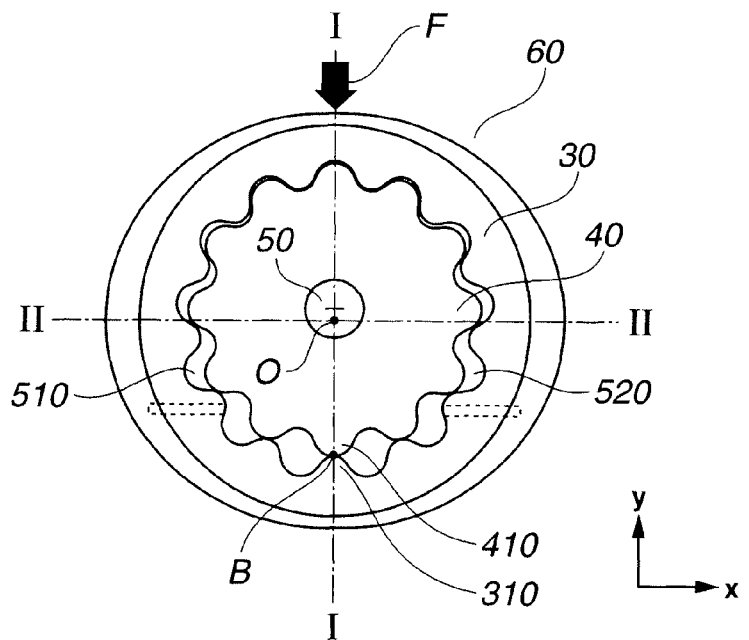
FIG. 6 is an explanatory drawing illustrating the relationship between the direction of action of a force F acting on the outer rotor in the negative y-axis direction and a pump performance.

FIG. 5 shows the relationship between the direction of action of a force F acting on outer rotor 30 in the positive y-axis direction and a pump performance, whereas FIG. 6 shows the relationship between the direction of action of force F acting on outer rotor 30 in the negative y-axis direction and a pump performance.

In FIG. 5, outer rotor 30 moves or displaces in the positive y-axis direction by the force F, so as to reduce the tip clearance between internal toothed gear 310 and external toothed gear 410 at the confinement portion B. Thus, with the force F acting on outer rotor 30 in the positive y-axis direction, the tip clearance between internal toothed gear 310 and external toothed gear 410 at the confinement portion B becomes minimum. This contributes to a less leakage of working fluid from discharge area 520 to suction area 510 at the confinement portion B.

In contrast to the above, when force F acts on outer rotor 30 in the negative y-axis direction as seen in FIG. 6, the tip clearance between internal toothed gear 310 and external toothed gear 410 at the confinement portion B tends to increase. This results in an increase in a working-fluid leakage at the confinement portion B.

Therefore, when the force F acting on outer rotor 30 has a component force of the positive y-axis direction, a working-fluid leakage tends to reduce, thus enhancing the pump performance. Conversely when the force F acting on outer rotor 30 has a component force of the negative y-axis direction, a working-fluid leakage tends to increase, thus deteriorating the pump performance.

[Deviation of Geometric Center of Inner Rotor from Axis of Drive Shaft and Revolution of Outer Rotor]

Figure 7:
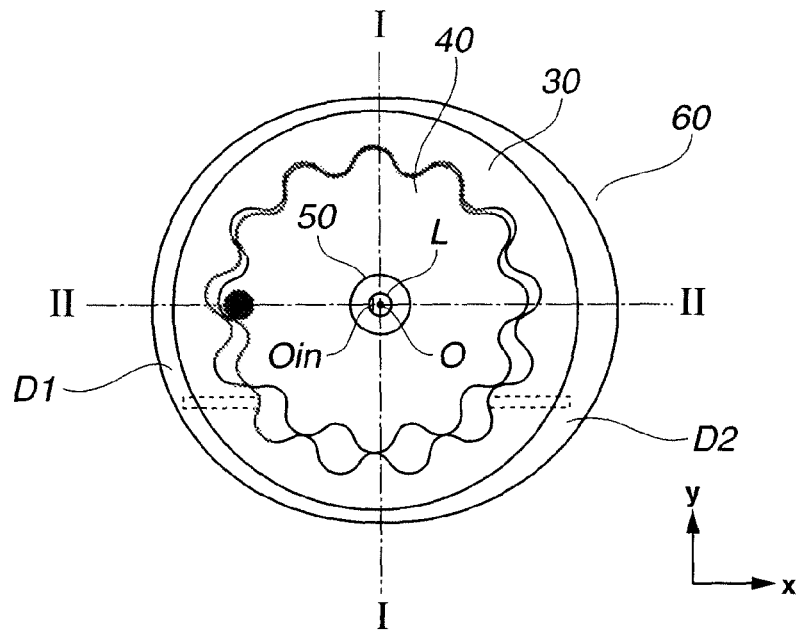
FIG. 7 is an explanatory drawing illustrating a clearance space D (first and second areas D1-D2) in the presence of an eccentricity (or a deviation) of an inner-rotor center Oin from a drive-shaft center O, in the internal gear pump of the embodiment.
Figure 8:
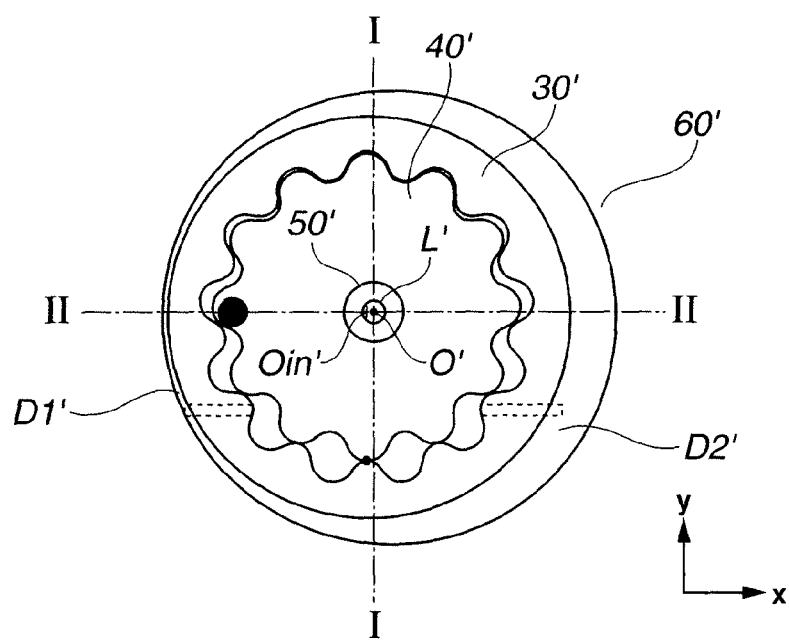
FIG. 8 is an explanatory drawing illustrating a clearance space D' (first and second areas D1'-D2') in the presence of an eccentricity (or a deviation) of an inner-rotor center Oin' from a drive-shaft center O', in an internal gear pump of a comparative example.

FIG. 7 shows the relationship among an eccentricity (a deviation) between the geometric center Oin of inner rotor 40 and the center O of drive shaft 50, the clearance space D ($1^{st}$ and $2^{nd}$ areas D1-D2 described later in detail) defined between cam-ring inner periphery 61 and outer-rotor outer peripheral surface 320, and the shape of cam-ring inner periphery 61, in the presence of the eccentricity (or the deviation) between two centers Oin and O, in internal gear pump 1 of the embodiment. FIG. 8 shows the relationship among an eccentricity (a deviation) between a geometric center Oin' of an inner rotor 40' and a center O' of a drive shaft 50', a clearance space D' ($1^{st}$ and $2^{nd}$ areas D1'-D2' described later in detail) defined between the inner periphery of a cam ring 60' and the outer peripheral surface of an outer rotor 30', and the shape of the inner periphery of cam ring 60', in the presence of the eccentricity (or the deviation) between two centers Oin' and O', in the internal gear pump of the comparative example. The internal gear pump 1 of the embodiment of FIG. 7 differs from that of the comparative example of FIG. 8, in that the inner periphery 61 of cam ring 60 of the embodiment has a substantially elliptic shape having a major axis (i.e., $2^{nd}$ axis II-II) along the x-axis and a minor axis (i.e., $1^{st}$ axis I-I) along the y-axis, whereas the inner periphery of cam ring 60' of the comparative example has a complete round shape.

In the eccentric-rotor type internal gear pumps of the embodiment and the comparative example, respectively shown in FIGS. 7-8, suppose that, due to an installation error or due to individual differences of inner rotors manufactured, the geometric centers Oin and Oin' of inner rotors 40 and 40' slightly deviate from the respective centers O and O' of drive shafts 50 and 50' by the same eccentricity (or the same deviation) γ in the negative x-axis direction. In FIGS. 7-8, the black dot of each of inner rotors 40 and 40' indicates the deviated direction (or the eccentric direction). Notice that the eccentricity γ (that is, the deviation of the inner-rotor geometric center Oin, Oin' from the drive-shaft center O, O'), occurring due to an installation error or due to individual differences of inner rotors manufactured, is different from the outer-rotor/inner-rotor eccentricity inherent in the eccentric-rotor type internal gear pump 1. Due to the eccentricity (deviation) γ of the inner-rotor geometric center Oin, Oin' from the drive-shaft center O, O', outer rotor 30, 30' in meshed-engagement with inner rotor 40, 40' deviates from the drive-shaft center in the negative x-axis direction.

In the presence of such an eccentricity (deviation) γ, during rotation of the drive shaft, inner rotor 40, 40' rotates, while its geometric center Oin, Oin' deviates the eccentricity γ from the drive-shaft center O, O'. That is, the geometric center Oin, Oin' of inner rotor 40, 40' draws a circle with a center equal to the drive-shaft center O, O' and a radius equal to the eccentricity γ. The circle with center O, O' and radius γ is the locus L, L' of all points in the plane whose distance from center O, O' is equal to γ. Due to the eccentricity γ, inner rotor 40, 40' revolves around drive-shaft center O, O'.

Therefore, under the previously-noted deviated state (the eccentric state) in which inner-rotor geometric centers Oin and Oin' slightly deviate from the respective drive-shaft centers O and O' by the same eccentricity (or the same deviation) γ in the negative x-axis direction, regarding clearance space D defined between cam ring 60 and outer rotor 30 and clearance space D' defined between cam ring 60' and outer rotor 30', a $1^{st}$ area D1 corresponding to the negative-x-axis-direction clearance space becomes the narrowest area. In contrast, a $2^{nd}$ area D2 corresponding to the positive-x-axis-direction clearance space becomes the widest area. With inner rotor 40, 40' rotating anti-clockwise, the narrowest area also moves in the anti-clockwise direction.

[Comparison of Change in Force Acting on Outer Rotor 30 of the Embodiment and Change in Force Acting on Outer Rotor 30' of the Comparative Example]

FIGS. 9A-9D show a change in force F acting on outer rotor 30' in the internal gear pump of the comparative example, during operation of the pump. On the other hand, FIGS. 10A-10D show a change in force F acting on outer rotor 30 in internal gear pump 1 of the embodiment, during operation of the pump. Suppose that, in the comparative example shown in FIGS. 9A-9D, inner rotor 40' and outer rotor 30' rotate anti-clockwise from the position of FIG. 9A through the position of FIG. 9B and the position of FIG. 9C to the position of FIG. 9D, in that order. Likewise, suppose that, in the embodiment shown in FIGS. 10A-10D, inner rotor 40 and outer rotor 30 rotate anti-clockwise from the position of FIG. 10A through the position of FIG. 10B and the position of FIG. 10C to the position of FIG. 10D, in that order.

As previously described, the negative-x-axis-direction outermost end C1 (i.e., the radially outermost end) of $1^{st}$ suction-side pressure introduction passage 111 is formed to be circumferentially offset toward the $2^{nd}$ axis II-II (the major axis) from the hypothetical position located on cam-ring inner periphery 61 and extending radially from the joined portion (corresponding to the positive-x-axis-direction innermost end of $1^{st}$ suction-side pressure introduction passage 111) of $1^{st}$ suction port 110 and $1^{st}$ suction-side pressure introduction passage 111. In a similar manner, the negative-x-axis-direction outermost end (i.e., the radially outermost end) of $2^{nd}$ suction-side pressure introduction passage 211 is formed to be circumferentially offset toward the $2^{nd}$ axis II-II (the major axis) from the hypothetical position located on cam-ring inner periphery 61 and extending radially from the joined portion (corresponding to the positive-x-axis-direction innermost end of $2^{nd}$ suction-side pressure introduction passage 211) of $2^{nd}$ suction port 210 and $2^{nd}$ suction-side pressure introduction passage 211. On the other hand, the positive-x-axis-direction outermost end C2 (i.e., the radially outermost end) of $1^{st}$ discharge-side pressure introduction passage 121 is formed to be circumferentially offset toward the $2^{nd}$ axis II-II (the major axis) from the hypothetical position located on cam-ring inner periphery 61 and extending radially from the joined portion (corresponding to the negative-x-axis-direction innermost end of $1^{st}$ discharge-side pressure introduction passage 121) of $1^{st}$ discharge port 120 and $1^{st}$ discharge-side pressure introduction passage 121. In a similar manner, the positive-x-axis-direction outermost end (i.e., the radially outermost end) of $2^{nd}$ discharge-side pressure introduction passage 221 is formed to be circumferentially offset toward the $2^{nd}$ axis II-II (the major axis) from the hypothetical position located on cam-ring inner periphery 61 and extending radially from the joined portion (corresponding to the negative-x-axis-direction innermost end of $2^{nd}$ discharge-side pressure introduction passage 221) of $2^{nd}$ discharge port 220 and $2^{nd}$ discharge-side pressure introduction passage 221.

With the previously-discussed arrangement or configuration of $1^{st}$ suction-side pressure introduction passage 111, $2^{nd}$ suction-side pressure introduction passage 211, $1^{st}$ discharge-side pressure introduction passage 121, and $2^{nd}$ discharge-side pressure introduction passage 221, regarding the side of $1^{st}$ and $2^{nd}$ suction ports 110 and 210, i.e., the left-hand side (viewing FIGS. 10A-10D and 9A-9D), a composite vector of pressures acting on outer peripheral surface 320 of outer rotor 30 is produced between (i) the $2^{nd}$ axis II-II (the major axis) parallel to the x-axis, which x-axis is perpendicular to $1^{st}$ axis I-I along the y-axis and (ii) $1^{st}$ and $2^{nd}$ suction-side pressure introduction passages 111 and 211. On the other hand, regarding the side of $1^{st}$ and $2^{nd}$ discharge ports 120 and 220, i.e., the right-hand side (viewing FIGS. 10A-10D and 9A-9D), a composite vector of pressures acting on outer peripheral surface 320 of outer rotor 30 is produced between (i) the $2^{nd}$ axis II-II (the major axis) and (ii) $1^{st}$ and $2^{nd}$ discharge-side pressure introduction passages 121 and 221.

(Angular Position "Pa" of Inner Rotor)

In FIGS. 10A-10D (the embodiment) and in FIGS. 9A-9D (the comparative example), the one-dotted line indicates working-fluid flow.

Figure 9A:
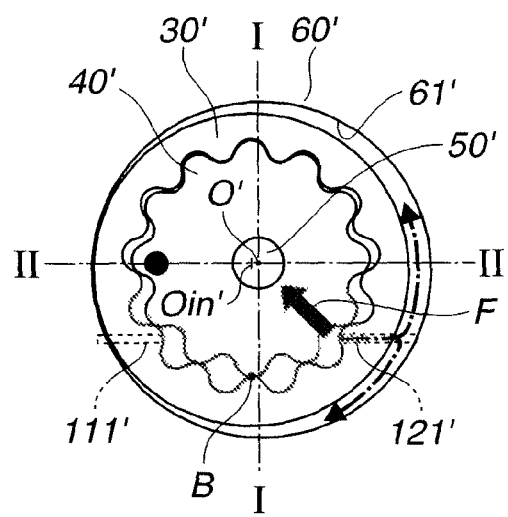
FIGS. 9A-9D are explanatory drawings illustrating a change in force F acting on the outer rotor in the internal gear pump of the comparative example, during operation of the pump.
Figure 10A:
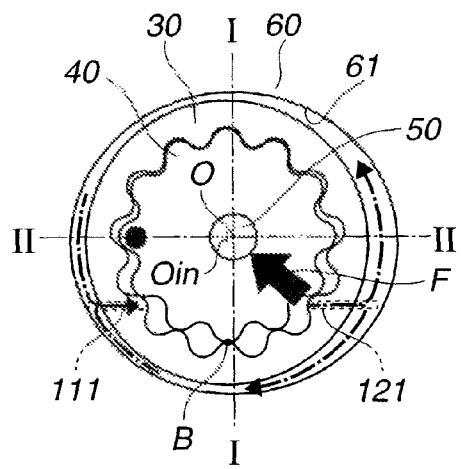
FIGS. 10A-10D are explanatory drawings illustrating a change in force F acting on the outer rotor in the internal gear pump of the embodiment, during operation of the pump.

At the angular position "Pa" shown in FIGS. 10A and 9A, due to the previously-noted eccentricity γ, the geometric center Oin, Oin' of inner rotor 40, 40' deviates from the drive-shaft center O, O' in the negative x-axis direction. Outer rotor 30, 30' also deviates from the drive-shaft center O, O' in the negative x-axis direction. Thus, the $2^{nd}$ area D2, D2' of clearance space D, D' defined between cam-ring inner periphery 61 and outer-rotor outer peripheral surface 320 becomes the widest area, while the $1^{st}$ area D1, D1' of clearance space D, D' becomes the narrowest area. The amount of working fluid of discharge pressure, supplied to clearance space D, D' through discharge-side pressure introduction passage 121, 121' opening into the $2^{nd}$ area D2, D2', becomes increased. In contrast, regarding the suction side, owing to the narrowest $1^{st}$ area D1, D1', in other words, owing to suction-side pressure introduction passage 111 (see the internal gear pump of the embodiment of FIG. 10A), 111' (see the internal gear pump of the comparative example of FIG. 9A) having the minimum opening area, the amount of working fluid, which is drawn from $1^{st}$ area D1, D1' of clearance space D, D' through suction-side pressure introduction passage 111, 111' into the suction area of the pumping chamber, becomes minimum.

A part of the discharge pressure, supplied from discharge-side pressure introduction passage 121, 121' to clearance space D, D' in the clockwise direction, is sucked or drawn again into the pumping chamber through suction-side pressure introduction passage 111, 111'. The discharge pressure, supplied from discharge-side pressure introduction passage 121, 121' to clearance space D, D' in the anti-clockwise direction, tends to gradually drop. Thus, the hydraulic pressure in clearance space D, D' near the positive-x-axis-direction outermost end of discharge-side pressure introduction passage 121, 121' becomes highest.

Therefore, at the angular position "Pa" shown in FIGS. 10A and 9A, outer rotor 30, 30' is forced in a direction oriented from the positive-x-axis-direction outermost end of discharge-side pressure introduction passage 121, 121' toward the drive-shaft center O, O' (the center of rotation of inner rotor 40, 40'), in other words, in the negative x-axis and positive y-axis direction (see the direction indicated by the thick-line vector F in FIGS. 10A and 9A). That is, at the angular position "Pa" shown in FIGS. 10A and 9A, the composite vector F of pressures acting on outer rotor 30, 30' has a component force of the positive y-axis direction. Therefore, in both the internal gear pumps of the embodiment and the comparative example, outer rotor 30, 30' displaces in the positive y-axis direction and the tip clearance between internal toothed gear 310 and external toothed gear 410 at the confinement portion B reduces, thus reducing a working-fluid leak, and consequently preventing the pump performance from being deteriorated.

(Angular Position "Pb" of Inner Rotor)

Figure 9B:
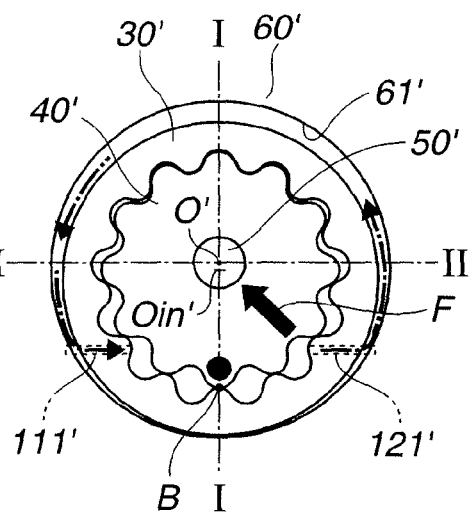
Figure 10B:
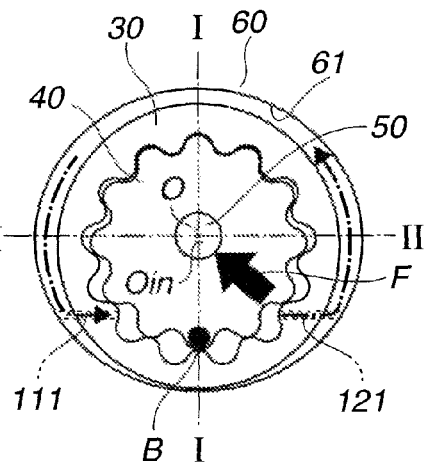
Figure 10C:
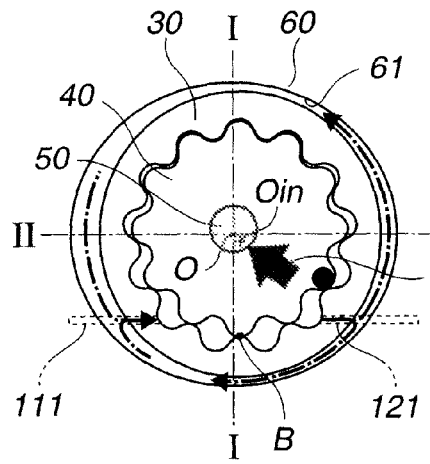

At the angular position "Pb" shown in FIGS. 10B and 9B, due to the previously-noted eccentricity γ, the geometric center Oin, Oin' of inner rotor 40, 40' deviates from the drive-shaft center O, O' in the negative y-axis direction. Outer rotor 30, 30' abuts cam-ring inner periphery 61, 61' at the outer-rotor negative y-axis end. Thus, clearance space D, D' of the negative y-axis direction becomes narrow, while clearance space D, D' of the positive y-axis direction becomes wide. Suction-side pressure introduction passage 111, 111' opens into the clearance-space $1^{st}$ area D1, D1', while discharge-side pressure introduction passage 121, 121' opens into the clearance-space $2^{nd}$ area D2, D2' having almost the same volumetric capacity as the clearance-space $1^{st}$ area D1, D1'.

Regarding a supply rate of working fluid flow discharged from discharge-side pressure introduction passage 121, 121' into clearance space D, D', there is a less supply of working fluid flowing in the clockwise direction. Almost all of the discharged working fluid is fed in the anti-clockwise direction, and then sucked or drawn into the pumping chamber through suction-side pressure introduction passage 111, 111'.

Therefore, in a similar manner to the angular position "Pa" shown in FIGS. 10A and 9A, at the angular position "Pb" shown in FIGS. 10B and 9B, the hydraulic pressure in clearance space D, D' near the positive-x-axis-direction outermost end of discharge-side pressure introduction passage 121, 121' becomes highest. That is, in the same manner as the angular position "Pa" shown in FIGS. 10A and 9A, at the angular position "Pb" shown in FIGS. 10B and 9B, the composite vector F of pressures acting on outer rotor 30, 30' has a component force of the positive y-axis direction. This contributes to a reduction of working-fluid leakage.

(Angular Position "Pc" of Inner Rotor of Comparative Example)

Figure 9C:
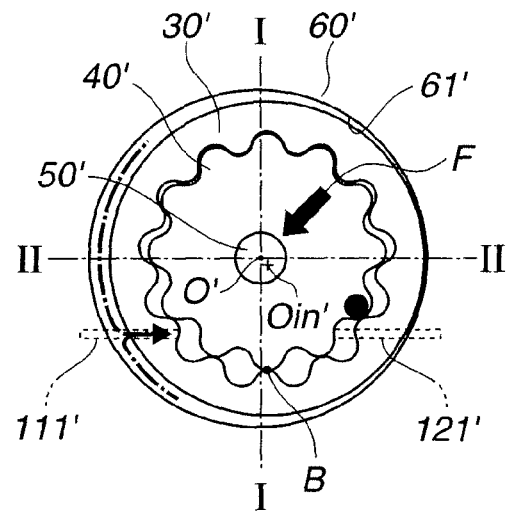

At the angular position "Pc" shown in FIG. 9C (the comparative example), due to the previously-noted eccentricity γ, the geometric center Oin' of inner rotor 40' deviates from the drive-shaft center O' in the positive x-axis and negative y-axis direction. Outer rotor 30' also deviates from the drive-shaft center O' in the positive x-axis and negative y-axis direction. The outer periphery of outer rotor 30' and cam-ring inner periphery 61' abut each other near the positive-x-axis-direction outermost end of discharge-side pressure introduction passage 121'. Thus, in the internal gear pump of the comparative example, at the angular position "Pc", suction-side pressure introduction passage 111' opens into the clearance-space $1^{st}$ area D1', while the opening end (exactly, the positive-x-axis-direction outermost end) of discharge-side pressure introduction passage 121' becomes closed. Regarding working-fluid flow drawn from or discharged into clearance space D', working fluid can be drawn through suction-side pressure introduction passage 111' into the pumping chamber, while there is a less supply of working fluid from discharge-side pressure introduction passage 121' to the clearance-space $2^{nd}$ area D2'. Thus, the hydraulic pressure in clearance space D' near the negative-x-axis-direction outermost end of suction-side pressure introduction passage 111' becomes lowest. As a result, the hydraulic pressure in clearance space D' of the negative x-axis direction and negative y-axis direction becomes relatively low, while the hydraulic pressure in clearance space D' of the positive x-axis direction and positive y-axis direction becomes relatively high. That is, at the angular position "Pc" shown in FIG. 9C (the comparative example), the composite vector F of pressures acting on outer rotor 30' has a component force of the negative y-axis direction. Therefore, in the internal gear pump of the comparative example, at the angular position "Pc" shown in FIG. 9C, outer rotor 30' displaces in the negative y-axis direction and the tip clearance at the confinement portion B increases, thus causing an increase in working-fluid leakage, that is, a deterioration in pump performance.

(Angular Position "Pc" of Inner Rotor of Embodiment)

In contrast to the above, in the internal gear pump of the embodiment, cam-ring inner periphery 61 is formed into a substantially ellipse that the line II-II (the 2nd axis) through the drive-shaft center O and parallel to the x-axis is the major axis, and the line I-I (the $1^{st}$ axis) through the drive-shaft center O and parallel to the y-axis is the minor axis. As can be seen from the angular position "Pc" shown in FIG. 10C, even when geometric center Oin of inner rotor 40 deviates from the drive-shaft center O by the eccentricity γ, owing to the substantially elliptic shape of cam-ring inner periphery 61, outer rotor 30 is not brought into abutted-engagement with cam-ring outer periphery 61. Unlike the comparative example, at the angular position "Pc", the opening end (exactly, the positive-x-axis-direction outermost end) of discharge-side pressure introduction passage 121 of the pump of the embodiment does not become closed, but remains open. Thus, the hydraulic pressure in clearance space D near the positive-x-axis-direction outermost end of discharge-side pressure introduction passage 121 becomes highest, while the hydraulic pressure in clearance space D near the negative-x-axis-direction outermost end of suction-side pressure introduction passage 111 becomes lowest. As a result, in the same manner as the angular position "Pa" of FIG. 10A and the angular position "Pb", of FIG. 10B, at the angular position "Pc" shown in FIG. 10C, outer rotor 30 is forced in the negative x-axis and positive y-axis direction (see the direction indicated by the thick-line vector F in FIG. 10C). That is, at the angular position "Pc" shown in FIG. 10C, the composite vector F of pressures acting on outer rotor 30 has a component force of the positive y-axis direction. Therefore, in the internal gear pump of the embodiment, outer rotor 30 displaces in the positive y-axis direction and the tip clearance at the confinement portion B reduces, thus reducing a working-fluid leak, and consequently preventing the pump performance from being deteriorated.

(Angular Position "Pd" of Inner Rotor)

Figure 9D:
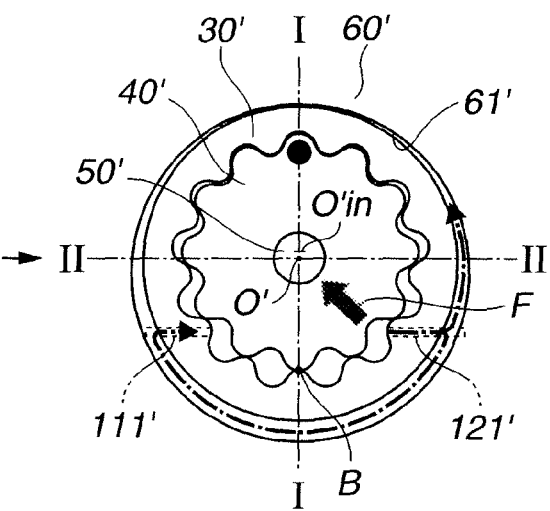
Figure 10D:
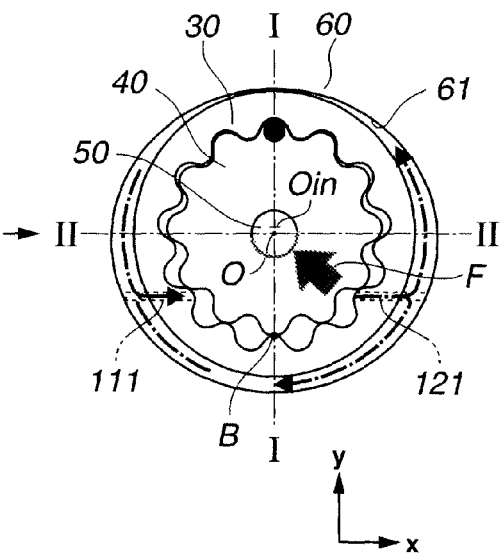

At the angular position "Pd" shown in FIGS. 10D and 9D, due to the previously-noted eccentricity γ, the geometric center Oin, Oin' of inner rotor 40, 40' deviates from the drive-shaft center O, O' in the positive y-axis direction. Outer rotor 30, 30' abuts cam-ring inner periphery 61, 61' at the outer-rotor positive y-axis end. Thus, clearance space D, D' of the positive y-axis direction becomes narrow, while clearance space D, D' of the negative y-axis direction becomes wide. Suction-side pressure introduction passage 111, 111' opens into the clearance-space $1^{st}$ area D1, D1', while discharge-side pressure introduction passage 121, 121' opens into the clearance-space $2^{nd}$ area D2, D2' having almost the same volumetric capacity as the clearance-space $1^{st}$ area D1, D1'. Therefore, in the same manner as the angular position "Pb" shown in FIGS. 10B and 9B, at the angular position "Pd" shown in FIGS. 10D and 9D, the composite vector F of pressures acting on outer rotor 30, 30' has a component force of the positive y-axis direction, thus reducing a working-fluid leak.

Effects of the Embodiment (1) In internal gear pump 1 employing $1^{st}$ and $2^{nd}$ housings 10 and 20 having cam ring 60, outer rotor 30 rotatably housed in cam ring 60 and having internal toothed gear 310 formed on the inner periphery, inner rotor 40 rotatably provided in the inner periphery of outer rotor 30 and having external toothed gear 410 formed on the outer periphery and in meshed-engagement with internal toothed gear 310, drive shaft 50 fixedly connected to inner rotor 40 for driving inner rotor 40 in a selected one of a normal-rotational direction and a reverse-rotational direction, suction port 110, 210 opening into pumping chambers 500 and provided at the side of the negative x-axis direction with respect to the line I-I (the $1^{st}$ axis or the minor axis) extending in the y-axis direction and interconnecting the confinement portion B of pumping chambers 500 (defined between outer-rotor internal toothed gear 310 and inner-rotor external toothed gear 410) having the maximum volumetric capacity and the completely-meshed-engagement portion A of pumping chambers 500 having the minimum volumetric capacity, discharge port 120, 220 opening into pumping chambers 500 and provided at the side of the positive x-axis direction with respect to the line I-I (the $1^{st}$ axis or the minor axis), suction-side pressure introduction passage 111, 211 intercommunicating suction port 110, 210 and the first-port side area D1 of clearance space D defined on the outer periphery of outer rotor 30, and discharge-side pressure introduction passage 121, 221 intercommunicating discharge port 120, 220 and the second-port side area D2 of clearance space D defined on the outer periphery of outer rotor 30, regarding clearance space D defined between the outer peripheral surface of outer rotor 30 and the inner peripheral surface of cam ring 60, the clearance space D of the direction of the line II-II (the $2^{nd}$ axis or the major axis) perpendicular to the line I-I and parallel to the x-axis is dimensioned to be greater than the clearance space D of the direction of the line I-I (the $1^{st}$ axis or the minor axis) parallel to the y-axis.

Therefore, even when outer rotor 30 revolves around inner rotor 40 with the eccentricity γ (that is, the deviation of the inner-rotor geometric center Oin from the drive-shaft center O), discharge-side pressure introduction passage 121, 221 cannot be closed. That is, according to the internal gear pump of the embodiment, discharge pressure can be always supplied into clearance space D even in the presence of the eccentricity γ, and thus it is possible to keep the hydraulic pressure in clearance space D near the outermost opening end of discharge-side pressure introduction passage 121, 221 at a high pressure level. As a result of this, force F acting on outer rotor 30 always has a component of force of the positive y-axis direction, thus effectively reducing a leak of working fluid at the confinement portion B. Thus, it is possible to avoid the pump discharge performance from being deteriorated.

(2) Clearance space D defined between the outer peripheral surface 320 of outer rotor 30 and the inner peripheral surface of cam ring 60 is configured to be maximum on the line II-II (the $2^{nd}$ axis) parallel to the x-axis.

(3) The inner peripheral surface (in particular, a curvature of inner periphery 61) of cam ring 60 is configured to circumferentially continuously change from the line I-I (the $1^{st}$ axis) parallel to the y-axis to the line II-II (the $2^{nd}$ axis) parallel to the x-axis.

(4) In internal gear pump 1 employing $1^{st}$ and $2^{nd}$ housings 10 and 20 having cam ring 60, outer rotor 30 rotatably housed in cam ring 60 and having internal toothed gear 310 formed on the inner periphery, inner rotor 40 rotatably provided in the inner periphery of outer rotor 30 and having external toothed gear 410 formed on the outer periphery and in meshed-engagement with internal toothed gear 310, drive shaft 50 fixedly connected to inner rotor 40 for driving inner rotor 40 in a selected one of a normal-rotational direction and a reverse-rotational direction, suction port 110, 210 opening into pumping chambers 500 and provided at one side of the line I-I (the $1^{st}$ axis or the minor axis) interconnecting the confinement portion B of pumping chambers 500 (defined between outer-rotor internal toothed gear 310 and inner-rotor external toothed gear 410) having the maximum volumetric capacity and the completely-meshed-engagement portion A of pumping chambers 500 having the minimum volumetric capacity, discharge port 120, 220 opening into pumping chambers 500 and provided at the opposite side of the line I-I (the $1^{st}$ axis or the minor axis), suction-side pressure introduction passage 111, 211 intercommunicating suction port 110, 210 and the first-port side area D1 of clearance space D defined on the outer periphery of outer rotor 30, and discharge-side pressure introduction passage 121, 221 intercommunicating discharge port 120, 220 and the second-port side area D2 of clearance space D defined on the outer periphery of outer rotor 30, the inner peripheral surface of cam ring 60 is formed into a substantially elliptic shape that the line I-I (the $1^{st}$ axis) parallel to the y-axis is the minor axis and the line II-II (the $2^{nd}$ axis) through the center of the minor axis I-I and parallel to the x-axis perpendicular to the line I-I is the major axis whose length is longer than the minor axis (i.e., the line I-I).

Thus, the internal gear pump structure of the above item (4) can provide the same operation and effects as that of the item (1), that is, a continuous discharge-pressure supply into clearance space D with discharge-side pressure introduction passage 121, 221 kept continuously open during rotation of inner rotor 40 even in the presence of the eccentricity γ, in other words, a reduced working-fluid leakage at the confinement portion B.

(5) In lieu thereof, the inner peripheral surface of cam ring 60 may be formed into a substantially oval shape obtained by connecting a pair of half rounds, which are symmetrical with respect to the line I-I parallel to the y-axis.

(6) Alternatively, the inner peripheral surface of cam ring 60 may be formed into a geometrical elliptic shape with foci F1 and F2 (two fixed points on a major axis) and a length b of the major axis (i.e., the $2^{nd}$ axis II-II) on one plane (i.e., the x-y plane including both the x-axis and the y-axis), where, assuming that "P" is any point of the geometrical elliptic shape, the sum (|PF1|+|PF2|) of the distance |PF1| between the $1^{st}$ fixed point (the $1^{st}$ focus) F1 and the point P and the distance |PF2| between the $2^{nd}$ fixed point (the 2 focus) F2 and the point P is equal to a constant value, that is, the length b of the major axis.

(7) In internal gear pump 1 employing $1^{st}$ and $2^{nd}$ housings 10 and 20 having cam ring 60, outer rotor 30 rotatably housed in cam ring 60 and having internal toothed gear 310 formed on the inner periphery, inner rotor 40 rotatably provided in the inner periphery of outer rotor 30 and having external toothed gear 410 formed on the outer periphery and in meshed-engagement with internal toothed gear 310, drive shaft 50 fixedly connected to inner rotor 40 for driving inner rotor 40 in a selected one of a normal-rotational direction and a reverse-rotational direction, suction port 110, 210 opening into pumping chambers 500 and provided at one side of the line I-I (the $1^{st}$ axis or the minor axis) interconnecting the confinement portion B of pumping chambers 500 (defined between outer-rotor internal toothed gear 310 and inner-rotor external toothed gear 410) having the maximum volumetric capacity and the completely-meshed-engagement portion A of pumping chambers 500 having the minimum volumetric capacity, discharge port 120, 220 opening into pumping chambers 500 and provided at the opposite side of the line I-I (the $1^{st}$ axis or the minor axis), suction-side pressure introduction passage 111, 211 intercommunicating suction port 110, 210 and the first-port side area D1 of clearance space D defined on the outer periphery of outer rotor 30, and discharge-side pressure introduction passage 121, 221 intercommunicating discharge port 120, 220 and the second-port side area D2 of clearance space D defined on the outer periphery of outer rotor 30, regarding a pressure distribution of hydraulic pressure introduced into clearance space D defined between the outer peripheral surface of outer rotor 30 and the inner peripheral surface of cam ring 60 during operation of pump 1, the hydraulic pressure in clearance space D of the direction along the line II-II (the major axis) perpendicular to the line I-I (the minor axis) and parallel to the x-axis is higher than the hydraulic pressure in clearance space D of the direction along the line I-I (the minor axis) parallel to the y-axis.

The internal gear pump structure of the above item (7) can provide the same operation and effects as that of the item (1), that is, a continuous discharge-pressure supply into clearance space D with discharge-side pressure introduction passage 121, 221 kept continuously open during rotation of inner rotor 40 even in the presence of the eccentricity γ, in other words, a reduced working-fluid leakage at the confinement portion B.

(8) The hydraulic pressure of the suction port side on the line II-II (the major axis) is substantially identical to the hydraulic pressure in suction-side pressure introduction passage 111, 211. The hydraulic pressure of the discharge port side on the line II-II (the major axis) is substantially identical to the hydraulic pressure in discharge-side pressure introduction passage 121, 221.

(9) The clearance space D of the second axis side (the major axis side) with respect to suction-side pressure introduction passage 111, 211 is dimensioned to be greater than the clearance space D of the confinement portion side with respect to suction-side pressure introduction passage 111, 211.

(10) The inner peripheral surface of cam ring 60 is configured to circumferentially continuously change from the line I-I (the $1^{st}$ axis) parallel to the y-axis to the line II-II (the $2^{nd}$ axis) parallel to the x-axis.

(11) In internal gear pump 1 employing $1^{st}$ and $2^{nd}$ housings 10 and 20 having cam ring 60, outer rotor 30 rotatably housed in cam ring 60 and having internal toothed gear 310 formed on the inner periphery, inner rotor 40 rotatably provided in the inner periphery of outer rotor 30 and having external toothed gear 410 formed on the outer periphery and in meshed-engagement with internal toothed gear 310, drive shaft 50 fixedly connected to inner rotor 40 for driving inner rotor 40 in a selected one of a normal-rotational direction and a reverse-rotational direction, suction port 110, 210 opening into pumping chambers 500 and provided at one side of the line I-I (the $1^{st}$ axis or the minor axis) interconnecting the confinement portion B of pumping chambers 500 (defined between outer-rotor internal toothed gear 310 and inner-rotor external toothed gear 410) having the maximum volumetric capacity and the completely-meshed-engagement portion A of pumping chambers 500 having the minimum volumetric capacity, discharge port 120, 220 opening into pumping chambers 500 and provided at the opposite side of the line I-I (the $1^{st}$ axis or the minor axis), suction-side pressure introduction passage 111, 211 intercommunicating suction port 110, 210 and the first-port-side area D1 of clearance space D defined on the outer periphery of outer rotor 30, and discharge-side pressure introduction passage 121, 221 intercommunicating discharge port 120, 220 and the second-port side area D2 of clearance space D defined on the outer periphery of outer rotor 30, a composite vector F of pressures (forces), acting on the outer periphery of outer rotor 30 within the first-port side area D1 of clearance space D, is produced between (i) the line II-II (the major axis) parallel to the x-axis, which x-axis is perpendicular to the line I-I (the minor axis) parallel to the y-axis and (ii) suction-side pressure introduction passage 111, 211, while a composite vector F of pressures (forces), acting on the outer periphery of outer rotor 30 within the second-port side area D2 of clearance space D, is produced between (i) the line II-II (the major axis) and (ii) discharge-side pressure introduction passage 121, 221.

The internal gear pump structure of the above item (11) can provide the same operation and effects as that of the item (1), that is, a continuous discharge-pressure supply into clearance space D with discharge-side pressure introduction passage 121, 221 kept continuously open during rotation of inner rotor 40 even in the presence of the eccentricity γ, in other words, a reduced working-fluid leakage at the confinement portion B.

(12) The hydraulic pressure of the suction port side on the line II-II (the major axis) is designed to be substantially identical to the hydraulic pressure in suction-side pressure introduction passage 111, 211. The hydraulic pressure of the discharge port side on the line II-II (the major axis) is designed to be substantially identical to the hydraulic pressure in discharge-side pressure introduction passage 121, 221.

(13) The radially outermost end (the negative-x-axis-direction outermost end C1) of suction-side pressure introduction passage 111, 211 is formed to be circumferentially offset toward the line II-II (the major axis) from the hypothetical position located on cam-ring inner periphery 61 and extending radially from the joined portion of suction port 110, 210 and suction-side pressure introduction passage 111, 211, while the radially outermost end (the positive-x-axis-direction outermost end C2) of discharge-side pressure introduction passage 121, 221 is formed to be circumferentially offset toward the line II-II (the major axis) from the hypothetical position located on cam-ring inner periphery 61 and extending radially from the joined portion of discharge port 120, 220 and discharge-side pressure introduction passage 121, 221.

(14) Suction-side pressure introduction passage 111, 211 and discharge-side pressure introduction passage 121, 221 are formed on the substantially same straight line extending in the x-axis direction.

(15) The joined portion of suction port 110, 210 and suction-side pressure introduction passage 111, 211 is configured or formed in a position circumferentially displaced substantially 60 degrees in a clockwise direction from the confinement portion B, whereas the joined portion of discharge port 120, 220 and discharge-side pressure introduction passage 121, 221 is configured or formed in a position circumferentially displaced substantially 60 degrees in an anti-clockwise direction from the confinement portion B.

(16) Suction-side pressure introduction passage 111, 211 is configured to intercommunicate suction port 110, 210 and clearance space D (i.e., the $1^{st}$ area D1) of the suction port side defined between cam ring 60 and outer rotor 30, whereas discharge-side pressure introduction passage 121, 221 is configured to intercommunicate discharge port 120, 220 and clearance space D (i.e., the $2^{nd}$ area D2) of the discharge port side defined between cam ring 60 and outer rotor 30.

(17) In a hydraulic power steering device employing hydraulic power cylinder 4b having $1^{st}$ and $2^{nd}$ cylinder chambers (hydraulic chambers) 4d and 4e for assisting rack shaft 4a and pinion shaft 2d both adapted to be linked to steered road wheels and steering wheel 2a, $1^{st}$ fluid line 5a connected to $1^{st}$ cylinder chamber 4d, $2^{nd}$ fluid line 5b connected to $2^{nd}$ cylinder chamber 4e, reversible pump 1 employing drive shaft 50, pumping chambers 500 configured to pressurize working fluid by way of normal-rotation and reverse-rotation of drive shaft 50, a first suction-and-discharge port 110, 210 interconnecting pumping chambers 500 and $1^{st}$ fluid line 5a, and a second suction-and-discharge port 120, 220 interconnecting pumping chambers 500 and $2^{nd}$ fluid line 5b, for selectively supplying the working fluid from pumping chambers 500 into either one of $1^{st}$ and $2^{nd}$ fluid lines 5a and 5b, and an electric motor 1a connected to drive shaft 50 of reversible pump 1 for rotating the reversible pump in a selected one of a normal-rotational direction and a reverse-rotational direction, reversible pump 1 employs $1^{st}$ and $2^{nd}$ housings 10 and 20 having cam ring 60, outer rotor 30 rotatably housed in cam ring 60 and having internal toothed gear 310 formed on the inner periphery, inner rotor 40 rotatably provided in the inner periphery of outer rotor 30 and having external toothed gear 410 formed on the outer periphery and in meshed-engagement with internal toothed gear 310, drive shaft 50 fixedly connected to inner rotor 40 for driving inner rotor 40 in the selected one of the normal-rotational direction and the reverse-rotational direction, $1^{st}$ suction-and-discharge port 110, 210 opening into pumping chambers 500 and provided at one side of the line I-I (the $1^{st}$ axis or the minor axis) interconnecting the confinement portion B of pumping chambers 500 (defined between outer-rotor internal toothed gear 310 and inner-rotor external toothed gear 410) having the maximum volumetric capacity and the completely-meshed-engagement portion A of pumping chambers 500 having the minimum volumetric capacity, $2^{nd}$ suction-and-discharge port 120, 220 opening into pumping chambers 500 and provided at the opposite side of the line I-I (the $1^{st}$ axis or the minor axis), a first-port side pressure introduction passage 111, 211 intercommunicating $1^{st}$ suction-and-discharge port 110, 210 and the first-port side area D1 of clearance space D defined on the outer periphery of outer rotor 30, and a second-port side pressure introduction passage 121, 221 intercommunicating $2^{nd}$ suction-and-discharge port 120, 220 and the second-port side area D2 of clearance space D defined on the outer periphery of outer rotor 30, and the inner peripheral surface of cam ring 60 is formed into a substantially elliptic shape that the line I-I (the $1^{st}$ axis) parallel to the y-axis is the minor axis and the line II-II (the $2^{nd}$ axis) through the center of the minor axis I-I and parallel to the x-axis perpendicular to the line I-I is the major axis whose length is longer than the minor axis (i.e., the line I-I).

Thus, reversible pump 1 of the hydraulic power steering device of the above item (16) can provide the same operation and effects as that of the item (1).

(18) In lieu thereof, the inner peripheral surface of cam ring 60 is formed as a bore hole having a substantially oval shape obtained by connecting a pair of half rounds, which are symmetrical with respect to the line I-I parallel to the y-axis.

(19) The hydraulic pressure of the first port side on the line II-II (the major axis) is substantially identical to the hydraulic pressure in the first-port side pressure introduction passage 111, 211. The hydraulic pressure of the second port side on the line II-II (the major axis) is substantially identical to the hydraulic pressure in the second-port side pressure introduction passage 121, 221.

(20) The radially outermost end (the negative-x-axis-direction outermost end C1) of the first-port side pressure introduction passage 111, 211 is formed to be circumferentially offset toward the line II-II (the major axis) from the hypothetical position located on cam-ring inner periphery 61 and extending radially from the joined portion of the first port 110, 210 and the first-port side pressure introduction passages 111, 211, while the radially outermost end (the positive-x-axis-direction outermost end C2) of the second-port side pressure introduction passage 121, 221 is formed to be circumferentially offset toward the line II-II (the major axis) from the hypothetical position located on cam-ring inner periphery 61 and extending radially from the joined portion of the second port 120, 220 and the second-port side pressure introduction passage 121, 21.

Figure 11:
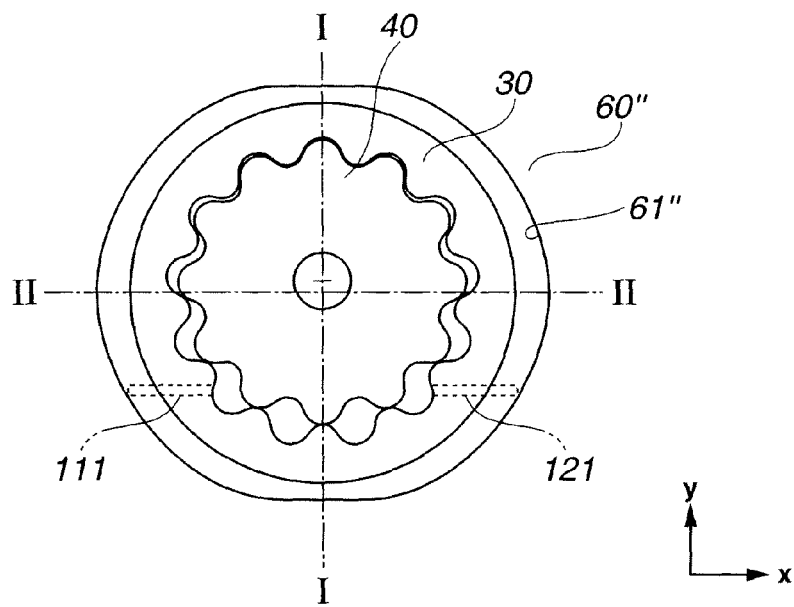
FIG. 11 is a drawing illustrating a first modified internal gear pump.
Figure 12:
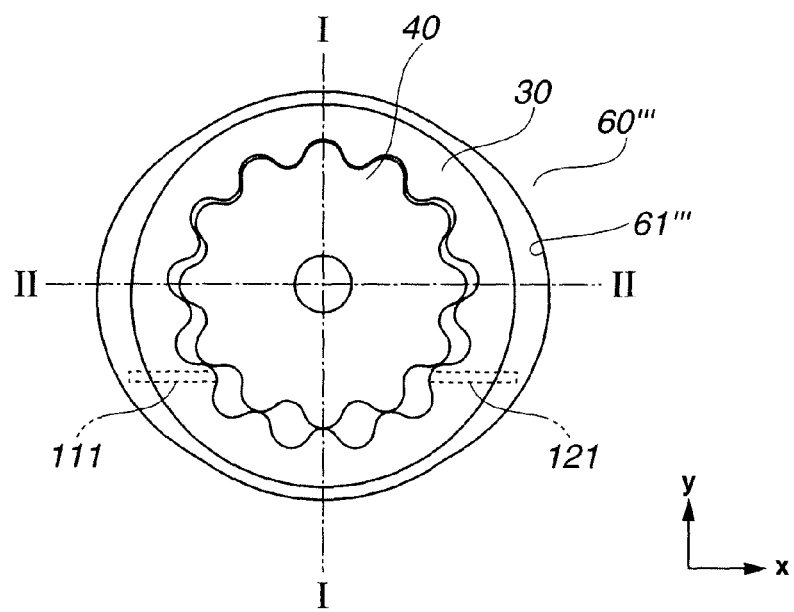
FIG. 12 is a drawing illustrating a second modified internal gear pump.

Referring now to FIGS. 11-12, there are shown the two modified internal gear pumps, slightly modified from internal gear pump 1 of the embodiment having the cross-section shown in FIGS. 3, 5-7, and 10A-10D. the $1^{st}$ modified internal gear pump of FIG. 11 is similar to pump 1 of the embodiment, except that cam-ring inner periphery 61 of the embodiment has a substantially elliptic shape having a major axis (i.e., $2^{nd}$ axis II-II) along the x-axis and a minor axis (i.e., $1^{st}$ axis I-I) along the y-axis, whereas an inner periphery 61" of a cam ring 60" of the $1^{st}$ modified internal gear pump of FIG. 11 has a substantially oval shape that a left-hand side half-round and a right-hand side half-round are symmetrical with each other with respect to the I-I line (the $1^{st}$ axis or the minor axis) parallel to the y-axis, and uppermost and lowermost ends of the left-hand side half-round and uppermost and lowermost ends of the right-hand side half-round are connected to each other by respective straight line segments having the same length. Cam ring 60" whose inner periphery 61" having the substantially oval shape shown in FIG. 11 is superior to cam ring 60 whose inner periphery 61 having the substantially elliptic shape shown in FIGS. 3, 5-7, and 10A-10D, in workability.

The $2^{nd}$ modified internal gear pump of FIG. 12 is similar to pump 1 of the embodiment of FIGS. 3, 5-7, and 10A-10D, except that cam-ring inner periphery 61 of the embodiment has a substantially elliptic shape having a major axis (i.e., $2^{nd}$ axis II-II) along the x-axis and a minor axis (i.e., $1^{st}$ axis I-I) along the y-axis, whereas an inner 5 periphery 60" of a cam ring 60" of the $2^{nd}$ modified internal gear pump of FIG. 12 has a substantially oval shape that both sides of a complete round are partially blistered, and the left-hand (negative-x-axis direction) and right-hand (the positive-x-axis direction) blistered portions are symmetrical with each other with respect to the I-I line (the $1^{st}$ axis or the minor axis) parallel to the y-axis. In the $1^{st}$ and $2^{nd}$ modified internal gear pumps having the respective cross-sections shown in FIGS. 11-12 and internal gear pump 1 of the embodiment shown in FIGS. 3, 5-7, and 10A-10D, the configurations of external rotor 30, internal rotor 40, suction-side pressure introduction passage 111 and discharge-side pressure introduction passage 121 are the same.

The entire contents of Japanese Patent Application No. 2006-196298 (filed Jul. 19, 2006) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A hydraulic power steering device comprising:
   a hydraulic power cylinder having first and second hydraulic chambers for assisting a steering force of a steering mechanism adapted to be linked to steered road wheels;
   a first fluid line connected to the first hydraulic chamber;
   a second fluid line connected to the second hydraulic chamber;
   a reversible pump comprising a drive shaft, a plurality of pumping chambers configured to pressurize working fluid by way of normal-rotation and reverse-rotation of the drive shaft, a first suction-and-discharge port interconnecting the pumping chambers and the first fluid line, and a second suction-and-discharge port interconnecting the pumping chambers and the second fluid line, for selectively supplying the working fluid from the pumping chambers into either one of the first and second fluid lines, and an electric motor connected to the drive shaft for rotating the reversible pump in a selected one of a normal-rotational direction and a reverse-rotational direction, the reversible pump comprising:
   a housing having an outer-rotor housing portion;
   an outer rotor rotatably housed in the outer-rotor housing portion and having an internal toothed gear formed on an inner periphery;
   an inner rotor rotatably provided in the inner periphery of the outer rotor and having an external toothed gear formed on an outer periphery and in meshed-engagement with the internal toothed gear;
   the drive shaft fixedly connected to the inner rotor for driving the inner rotor in the selected one of the normal-rotational direction and the reverse-rotational direction;
   the first suction-and-discharge port opening into the pumping chambers defined between the internal and external toothed gears and provided at one side with respect to a first axis interconnecting a confinement portion of the pumping chambers having a maximum volumetric capacity and a deeply-meshed-engagement portion of the pumping chambers having a minimum volumetric capacity;
   the second suction-and-discharge port opening into the pumping chambers and provided at the opposite side with respect to the first axis;
   a first pressure introduction passage intercommunicating the first suction-and-discharge port and a first-port side area of a clearance space extending along a second axis perpendicular to the first axis defined on an outer periphery of the outer rotor; and
   a second pressure introduction passage intercommunicating the second suction-and-discharge port and a second-port side area of the clearance space extending along the second axis perpendicular to the first axis defined on the outer periphery of the outer rotor;
   wherein an inner peripheral surface of the outer-rotor housing portion is formed into a substantially elliptic shape that the first axis is a minor axis and the second axis through the center of the minor axis and perpendicular to the first axis is a major axis whose length is longer than the minor axis.

2. The hydraulic power steering device as claimed in claim 1, wherein:
   the hydraulic pressure of the first port side on the second axis is substantially identical to the hydraulic pressure in the first pressure introduction passage; and
   the hydraulic pressure of the second port side on the second axis is substantially identical to the hydraulic pressure in the second pressure introduction passage.

3. The hydraulic power steering device as claimed in claim 1, wherein:
   a radially outermost end of the first pressure introduction passage is formed to be circumferentially offset toward the second axis from a hypothetical position located on an inner periphery of the outer-rotor housing portion and extending radially from a joined portion of the first suction-and-discharge port and the first pressure introduction passage, while a radially outermost end of the second pressure introduction passage is formed to be circumferentially offset toward the second axis from a hypothetical position located on the inner periphery of the outer-rotor housing portion and extending radially from a joined portion of the second suction-and-discharge port and the second pressure introduction passage.

* * * * *